US011874707B2

(12) United States Patent
Castro et al.

(10) Patent No.: US 11,874,707 B2
(45) Date of Patent: *Jan. 16, 2024

(54) DISPLAY ASSISTANT DEVICE

(71) Applicant: Google LLC, Mountain View, CA (US)

(72) Inventors: James Castro, San Jose, CA (US);
Marc Davidson, Sunnyvale, CA (US);
Chih-Min Chien, Taipei (TW); Daniel
Corbalan, San Francisco, CA (US);
Carl Cepress, Los Altos, CA (US);
Liang Ching Tseng, Taipei (TW)

(73) Assignee: Google LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/117,311

(22) Filed: Mar. 3, 2023

(65) Prior Publication Data
US 2023/0221771 A1 Jul. 13, 2023

Related U.S. Application Data

(63) Continuation of application No. 16/596,709, filed on Oct. 8, 2019, now Pat. No. 11,604,493, which is a
(Continued)

(51) Int. Cl.
G06F 1/16 (2006.01)
G02F 1/1333 (2006.01)
(Continued)

(52) U.S. Cl.
CPC ........ *G06F 1/166* (2013.01); *G02F 1/133308* (2013.01); *G02F 1/133753* (2013.01);
(Continued)

(58) Field of Classification Search
CPC ...... G06F 1/166; G06F 1/1605; G06F 1/1626; G06F 1/1637; G06F 1/1658;
(Continued)

(56) References Cited

U.S. PATENT DOCUMENTS

D346,594 S 5/1994 Skaggs
5,822,443 A 10/1998 Kim
(Continued)

FOREIGN PATENT DOCUMENTS

CN 107454513 A 12/2017
EP 0303912 A2 2/1989
(Continued)

OTHER PUBLICATIONS

Nest Hub, Google, thegadgeteer.com, published by Julie Strietelmeier on Sep. 6, 2019 © 2020 The Gadgeteer, online, site visited Jun. 15, 2020. Available at URL: https://the-gadgeteer.com/2019/09/09/google-nest-hub-review/ (Year: 2019).
(Continued)

*Primary Examiner* — Kidest Bahta
(74) *Attorney, Agent, or Firm* — Kilpatrick Townsend & Stockton LLP

(57) ABSTRACT

This application is directed to a display assistant device that acts as a voice-activated user interface device. The display assistant device includes a base, a screen and a speaker. The base is configured for sitting on a surface. The screen has a rear surface and is supported by the base at the rear surface. A bottom edge of the screen is configured to be held above the surface by a predefined height, and the base is substantially hidden behind the screen from a front view of the display assistant device. The speaker is concealed inside the base and configured to project sound substantially towards the front view of the display assistant device.

20 Claims, 16 Drawing Sheets

Related U.S. Application Data continuation of application No. PCT/US2018/064449, filed on Dec. 7, 2018, which is a continuation-in-part of application No. 29/663,723, filed on Sep. 18, 2018, now Pat. No. Des. 934,244, and a continuation-in-part of application No. 29/663,725, filed on Sep. 18, 2018, now Pat. No. Des. 935,456.

(60) Provisional application No. 62/743,464, filed on Oct. 9, 2018, provisional application No. 62/742,892, filed on Oct. 8, 2018, provisional application No. 62/742,888, filed on Oct. 8, 2018.

(51) Int. Cl.

| | |
|---|---|
| *G02F 1/1337* | (2006.01) |
| *G06F 3/16* | (2006.01) |
| *G10L 15/28* | (2013.01) |
| *G06F 21/83* | (2013.01) |
| *H04R 1/02* | (2006.01) |
| *H04R 1/34* | (2006.01) |
| *H04L 12/28* | (2006.01) |

(52) U.S. Cl.
CPC .......... *G06F 1/1605* (2013.01); *G06F 1/1626* (2013.01); *G06F 1/1637* (2013.01); *G06F 1/1658* (2013.01); *G06F 1/1683* (2013.01); *G06F 1/1686* (2013.01); *G06F 1/1688* (2013.01); *G06F 1/1698* (2013.01); *G06F 3/167* (2013.01); *G06F 21/83* (2013.01); *G10L 15/28* (2013.01); *H04R 1/023* (2013.01); *H04R 1/025* (2013.01); *H04R 1/028* (2013.01); *H04R 1/345* (2013.01); *G02F 1/133325* (2021.01); *G02F 1/133761* (2021.01); *H04L 12/282* (2013.01); *H04R 2499/15* (2013.01)

(58) Field of Classification Search
CPC .... G06F 1/1683; G06F 1/1686; G06F 1/1688; G06F 1/1698; G06F 3/167; G06F 21/83; G06F 1/1601; G02F 1/133308; G02F 1/133753; G02F 1/133325; G02F 1/133761; G02F 1/133322; G02F 2201/36; G10L 15/28; G10L 15/00; H04R 1/023; H04R 1/025; H04R 1/028; H04R 1/345; H04R 2499/15; H04R 2499/11; H04L 12/282; G05B 15/00; H04W 4/00
See application file for complete search history.

(56) References Cited

U.S. PATENT DOCUMENTS

| | | | |
|---|---|---|---|
| 6,032,918 A | 3/2000 | Cho | |
| 6,068,227 A | 5/2000 | Morgan et al. | |
| 6,411,271 B1 | 6/2002 | Bang et al. | |
| 7,296,653 B1 | 11/2007 | Smith, Jr. et al. | |
| D563,405 S | 3/2008 | Taniho et al. | |
| 7,388,744 B2 | 6/2008 | Chu | |
| 7,576,983 B2 | 8/2009 | Yamaguchi et al. | |
| D611,032 S | 3/2010 | Kim | |
| D612,837 S | 3/2010 | Murray | |
| 7,953,242 B2 | 5/2011 | Soga | |
| D680,653 S | 4/2013 | Fullerton | |
| 8,528,690 B1 | 9/2013 | Wu | |
| D702,675 S | 4/2014 | Jones | |
| D708,184 S | 7/2014 | Romanoff | |
| D710,715 S | 8/2014 | Bianco | |
| D716,293 S | 10/2014 | Hwang | |
| D716,815 S | 11/2014 | Van Hees | |
| D720,393 S | 12/2014 | Held | |
| D720,745 S | 1/2015 | Yeo | |
| 9,064,386 B2 | 6/2015 | Won et al. | |
| D734,179 S | 7/2015 | Golden | |
| D738,233 S | 9/2015 | Repp | |
| D741,853 S | 10/2015 | Barron | |
| D744,875 S | 12/2015 | Repp | |
| D747,704 S | 1/2016 | Tsou | |
| D757,162 S | 5/2016 | Lyons | |
| D769,231 S | 10/2016 | Kwak | |
| D782,466 S | 3/2017 | Yepez | |
| 9,641,920 B1 | 5/2017 | Jones et al. | |
| D789,362 S | 6/2017 | Elijas | |
| D811,383 S | 2/2018 | Diasabeygunawardena et al. | |
| 9,930,286 B2 | 3/2018 | Hamadate | |
| D829,704 S | 10/2018 | Oross | |
| D830,868 S | 10/2018 | Kress | |
| D845,355 S | 4/2019 | Demiter | |
| D847,452 S | 4/2019 | Angelopoulos | |
| 10,306,356 B2 | 5/2019 | Katz et al. | |
| D850,525 S | 6/2019 | Eun | |
| D857,007 S | 8/2019 | Pitallano | |
| D864,305 S | 10/2019 | Ortiz De Viveiros | |
| 10,484,770 B1 | 11/2019 | Rao et al. | |
| D871,500 S | 12/2019 | Balar | |
| D873,262 S | 1/2020 | Fernando | |
| D873,815 S | 1/2020 | McWilliam et al. | |
| D891,428 S | 7/2020 | Taylor | |
| D893,201 S | 8/2020 | Jiang | |
| D895,123 S | 9/2020 | He | |
| 10,795,407 B2 | 10/2020 | Wun | |
| D907,032 S | 1/2021 | Solomon | |
| D919,699 S | 5/2021 | Fuhs | |
| 2003/0202162 A1 | 11/2003 | Arai et al. | |
| 2003/0227739 A1* | 12/2003 | Kim | F16M 11/10 361/679.06 |
| 2005/0129263 A1 | 6/2005 | Tamura et al. | |
| 2005/0233781 A1 | 10/2005 | Erixon et al. | |
| 2006/0008103 A1 | 1/2006 | Takahashi et al. | |
| 2006/0039571 A1 | 2/2006 | Harris et al. | |
| 2006/0070280 A1 | 4/2006 | Yamamura et al. | |
| 2006/0187625 A1* | 8/2006 | Jung | G06F 1/1601 361/679.05 |
| 2007/0097608 A1 | 5/2007 | Matsutani et al. | |
| 2007/0206123 A1 | 9/2007 | Hsieh et al. | |
| 2008/0165485 A1 | 7/2008 | Zadesky et al. | |
| 2010/0205667 A1 | 8/2010 | Anderson et al. | |
| 2010/0212996 A1 | 8/2010 | Takashima | |
| 2010/0272307 A1 | 10/2010 | Okumura | |
| 2011/0242504 A1* | 10/2011 | Olcott | G03B 21/26 353/98 |
| 2013/0058023 A1 | 3/2013 | Supran | |
| 2013/0070172 A1 | 3/2013 | Ooe | |
| 2013/0077812 A1 | 3/2013 | Kishinami et al. | |
| 2013/0098854 A1 | 4/2013 | Lee | |
| 2013/0235420 A1 | 9/2013 | Nihashi | |
| 2013/0279730 A1 | 10/2013 | Tanaka | |
| 2013/0282499 A1 | 10/2013 | Kato | |
| 2013/0299668 A1 | 11/2013 | Van Barner | |
| 2014/0112512 A1 | 4/2014 | Su | |
| 2014/0247959 A1 | 9/2014 | Yamanaka et al. | |
| 2014/0376758 A1 | 12/2014 | Barcel | |
| 2015/0053497 A1 | 2/2015 | Horiuchi | |
| 2015/0185768 A1 | 7/2015 | Voege | |
| 2015/0195635 A1 | 7/2015 | Garfio | |
| 2015/0278499 A1 | 10/2015 | Levitov | |
| 2015/0326816 A1 | 11/2015 | Hamadate | |
| 2016/0037665 A1 | 2/2016 | Zhang et al. | |
| 2016/0139702 A1 | 5/2016 | Franklin | |
| 2017/0006715 A1 | 1/2017 | Choi | |
| 2017/0208364 A1 | 7/2017 | Glazier | |
| 2017/0278361 A1 | 9/2017 | Fujimoto | |
| 2017/0300893 A1 | 10/2017 | Sasaki | |
| 2018/0174584 A1 | 6/2018 | Chih et al. | |
| 2018/0190285 A1 | 7/2018 | Heckman et al. | |
| 2018/0199123 A1 | 7/2018 | Rao et al. | |
| 2019/0029103 A1 | 1/2019 | MacDonald | |
| 2019/0114880 A1 | 4/2019 | Hanes | |
| 2019/0181533 A1 | 6/2019 | Gummalla | |

(56) References Cited

U.S. PATENT DOCUMENTS

| | | | |
|---|---|---|---|
| 2019/0212774 A1 | 7/2019 | Patterson | |
| 2020/0090662 A1 | 3/2020 | Castro | |

FOREIGN PATENT DOCUMENTS

| | | | |
|---|---|---|---|
| JP | 2001169378 A | 6/2001 | |
| JP | 2007 259262 A | 10/2007 | |
| JP | 2008211381 A | 9/2008 | |
| JP | 2009 038446 A | 2/2009 | |
| JP | 2009267577 A | 11/2009 | |
| JP | 4808168 B2 | 11/2011 | |
| JP | 2014131243 | 7/2014 | |
| JP | 2015053540 | 3/2015 | |
| JP | 2018 121168 A | 8/2018 | |
| TW | 201131335 A | 9/2011 | |
| WO | 2006104101 | 10/2006 | |
| WO | 2018139462 A1 | 8/2018 | |

OTHER PUBLICATIONS

Home Hub Smart Display, Google, 9to5google.com, published by Stephen Hall on Sep. 18, 2018 © 2020 HP Development Company, L.P., online, site visited Sep. 8, 2020. Available at URL: https://9to5google.com/2018/09/18/google-home-hub-is-googles-first-party-smart-display-leaks-in-new-renders/ (Year: 2018).

Fusion Bob Free Standing Tablet Stand, BossTab USA, posplaza.com, author unlisted, published on Jul. 23, 2016 © 2020 POS Plaza, online, site visited Sep. 8, 2020. Available at URL: https://www.posplaza.com.au/ fusion-bob-free-standing-table-stand.html (Year: 2016).

I-Home Technology CO, Ltd, "Lynky: Touchscreen Smart Hub with Google Assistant", Feb. 24, 2018 (Feb. 24, 2018), pp. 1-13, XP055585514, Retrieved from the Internet: URL: https://www.indiegogo.com/projects/lynky-touchscreen-smart-hub-with-google-assistant [retrieved on May 3, 2019] p. 1-p. 8.

Ernoult et al., "ARCHOS Hello Activates AI, Displays and Manages Anything, Anywhere at home, Just by Asking", Available Online at: https://www.archos.com/corporate/press/press_releases/EN_20180828_ARCHOS_IFA_Next_2018_ARCHOS_Hello.pdf, Aug. 28, 2018, 6 pages.

Burns , "Google Home Hub Leaked: The New Do-All Screen", Available online at: https://www.slashgear.com/google-home-hub-release-details-date-images-smart-screen-18546222., Sep. 18, 2018, 8 pages.

Ballaith , "Exclusive Google Home Hub to be Launched on Oct. 9; A Smart Speaker with 7-Inch Display", Retrieved at: https://web.archive.org/veb/20181009015232/hllps://www_mysmartprice.com/gear/google-home-hub/, Sep. 18, 2018, 5 pages.

CNET: "We took apart the Google Home Hub and the Amazon Echo Show 2 : Cracking Open", Jan. 27, 2019, p. 1, XP054979644, Retrieved from the Internet: URL: https://www.youtube.com/watch?v=9vo7PtXlzCk [retrieved on Sep. 2, 2019] 2:45-19:00.

International Search Report and Written Opinion for PCT/US2019/028601 dated Dec. 20, 2019, all pages.

International Search Report and Written Opinion for PCT/US2018/064449 dated Aug. 28, 2019, all pages.

* cited by examiner

DISPLAY ASSISTANT DEVICE

RELATED APPLICATIONS

This application is a continuation of U.S. Non-Provisional patent application Ser. No. 16/596,709, filed Oct. 8, 2019, titled "Display Assistant Device," which is a continuation of International Application No. PCT/US2018/064449, filed Dec. 7, 2018, titled "Display Assistant Device," which claims priority to the following applications, each of which is incorporated by reference in its entirety:

- U.S. Provisional Patent Application No. 62/742,892, filed Oct. 8, 2018, titled "Display Assistant Device";
- U.S. Provisional Patent Application No. 62/742,888, filed Oct. 8, 2018, titled "Drop Protection for Display Assistant Device";
- U.S. Provisional Patent Application No. 62/743,464, filed Oct. 9, 2018, titled "Speaker Assembly in a Display Assistant Device"; and
- U.S. Design Application No. 29/663,725, filed Sep. 18, 2018, titled "Display Device of Portion Thereof"; and
- U.S. Design Application No. 29/663,723, filed Sep. 18, 2018, titled "Display Device of Portion Thereof.

This application is related to the following applications, each of which is incorporated by reference in its entirety:

- International Application No. PCT/US2018/064452, filed Dec. 7, 2018, titled "Drop Protection for Display Assistant Device";
- International Application No. PCT/US2018/064536, filed Dec. 7, 2018, titled "Speaker Assembly in a Display Assistant Device";
- U.S. patent application Ser. No. 16/525,360, filed Jul. 29, 2019, titled "Display Assistant Device," which claims priority to and is a continuation application of International Application No. PCT/US19/28601, filed Apr. 23, 2019, titled "Display Assistant Device"; and
- International Application No. PCT/US19/28959, filed Apr. 24, 2019, titled "Multipurpose Speaker Enclosure in a Display Assistant Device," which is herein incorporated by reference in its entirety.

TECHNICAL FIELD

This application relates generally to electronic devices, including but not limited to a voice-activated display assistant device that is used as a user interface device in a smart home environment.

BACKGROUND

Electronic devices integrated with microphones have been widely used to collect voice inputs from users and implement different voice-activated functions according to the voice inputs. For example, many state-of-the-art mobile devices include a voice assistant system (e.g., Siri and Google Assistant) that is configured to use voice inputs to initiate a phone call, conduct a restaurant search, start routing on a map, create calendar events, add a post to a social network, recognize a song and complete many other tasks. These mobile devices include complicated operating systems that implement tasks initiated by the voice inputs but do not constantly detect the voice inputs from their surroundings. A voice interface function has to be activated via the operating systems to make the mobile devices listen to the voice inputs. On the other hand, when an electronic device having a relatively simple structure and made at a low cost is applied to implement similar voice activated functions as the mobile devices, the electronic device is oftentimes simplified to a combination of a microphone and a speaker, eliminating the benefits offered by use of a display screen.

In addition, the voice activated functions currently implemented in many electronic devices are limited to Internet-based functions that involve remote servers (e.g., a search engine, a social network server or a voice assistant server). The results of the voice activated functions are used to control the electronic devices themselves, and do not impact any other remote or local electronic devices accessible to the user. Given that voice inputs are convenient for the user, it is beneficial to allow the user to use voice inputs to control the other electronic devices accessible to the user in addition to requesting the Internet-based functions limited between the remote servers and the electronic devices themselves.

SUMMARY

Accordingly, an electronic device is applied in a smart home environment to provide an eyes-free and hands-free voice interface that can activate voice-activated functions for media devices or smart home devices in the smart home environment. The electronic device is configured to sit at a fixed location in the smart home environment, and at least includes a display screen in addition to a microphone and a speaker. The electronic device does not include a complicated operating system, but provides a low cost user interface solution dedicated to constantly listening to its surroundings, collecting audio inputs, and presenting both audio and video information in response to the audio inputs. Further, in some implementations, the audio inputs are collected from the surroundings to initiate voice-activated functions on other media play devices or smart home devices coupled within the smart home environment. Examples of these voice-activated functions include, but are not limited to, initiating play of media content, transferring media content among different media devices, reviewing smart device readings and statuses, powering on or off a smart device, and controlling smart device settings.

In accordance with one aspect of this application, a display assistant device includes a base, a screen and a speaker. The base is configured for sitting on a surface. The screen has a rear surface and is supported by the base at the rear surface. A bottom edge of the screen is configured to be held above the surface by a predefined height, and the base is substantially hidden behind the screen from a front view of the display assistant device. The speaker is concealed inside the base and configured to project sound substantially towards the front view of the display assistant device. In some implementations, the speaker faces a space of the predefined height that is configured to separate the bottom edge of the screen and the surface. The speaker has a speaker opening, and the speaker opening has a dimension greater than the predefined height of the space. The speaker opening faces forward and is tilted downward with a tilting angle. The speaker is configured to project part of sound generated by the speaker towards the space between the bottom edge of the screen and the surface. In some implementations, the base has a housing that encloses the speaker, and the housing includes a plurality of speaker grill portions that permit sound generated by the speaker to exit the housing of the base. Further, in some implementations, the plurality of speaker grill portions are distributed on at least a front side, a rear side, a left side and a right side of the housing, and the sound generated by the speaker is guided inside the housing to exit the housing from the front, rear, left and right sides of the housing.

In accordance with various embodiments of this application, the display assistant device has a substantially small footprint that allows the display assistant device to be conveniently disposed at many different locations (e.g., a kitchen, living room and bedroom) in the smart home environment. Despite the substantially small footprint, the speaker has a relatively heavy weight and is configured to pull a center of mass of the display assistant device close to the surface on which the display assistant device sits. A low center of mass allows the display assistant device to maintain stability at time of being touched or hit. The display assistant device further includes many mechanical features configured to protect the screen of the display assistant from falling apart from the base and being damaged when the display assistant device hits a floor. By these means, this application provides a low-cost, mechanically robust, and voice-activated user interface solution that has visual display capabilities and supports various voice-activated functions.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

Like reference numerals refer to corresponding parts throughout the several views of the drawings.

DESCRIPTION OF IMPLEMENTATIONS

Figure 1:
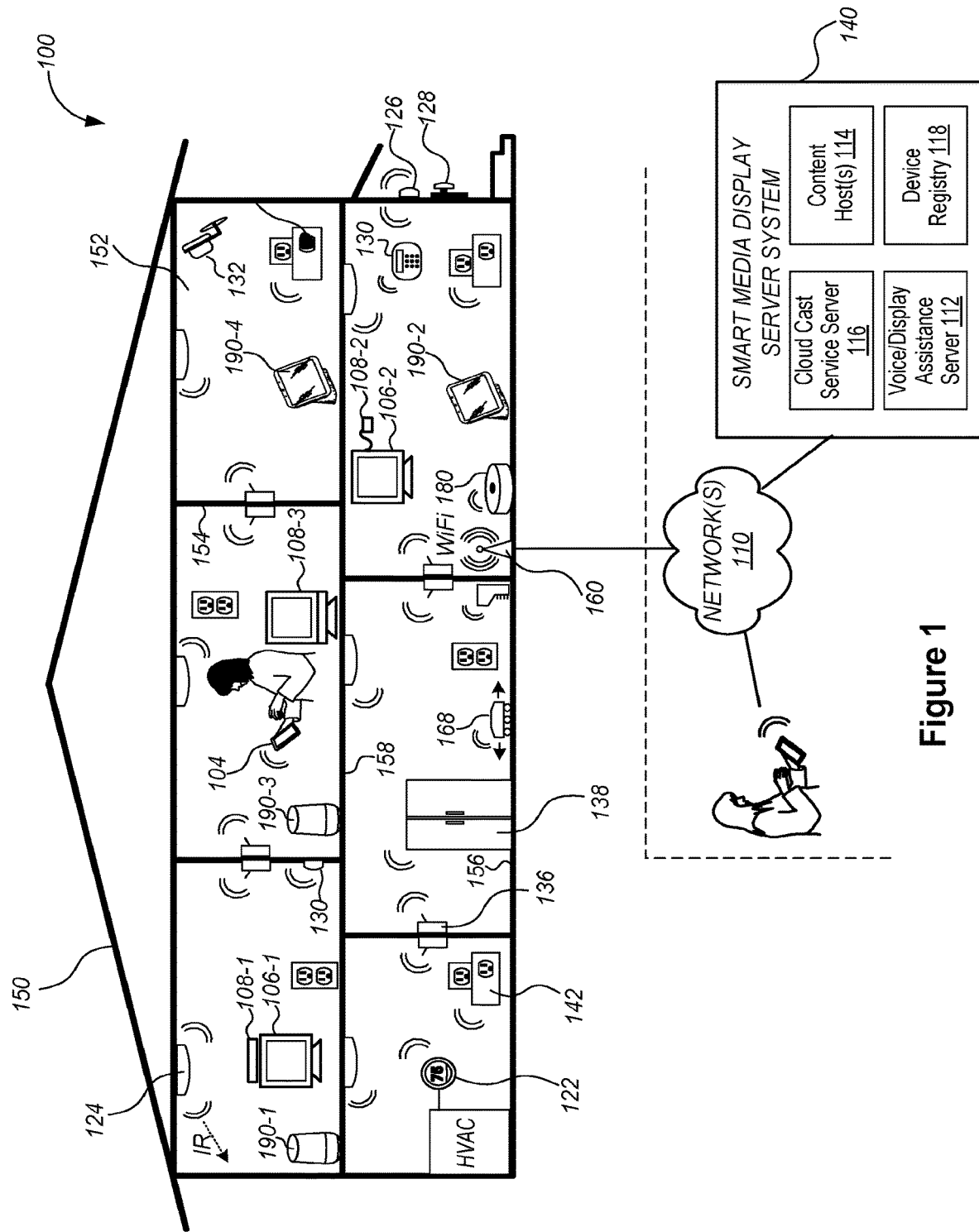
FIG. 1 is an example smart home environment in accordance with some implementations.

While digital revolution has provided many benefits ranging from openly sharing information to a sense of global community, emerging new technology often induces confusion, skepticism and fear among consumers, preventing consumers from benefitting from the technology. Electronic devices are conveniently used as voice interfaces to receive voice inputs from users and initiate voice-activated functions, and thereby offer eyes-free and hands-free solutions to approach both existing and emerging technology. Specifically, the voice inputs received at an electronic device can carry instructions and information even if a user's line of sight is obscured and his hands are full. To enable hands-free and eyes-free experience, the voice-activated electronic device listens to the ambient (i.e., processes audio signals collected from the ambient) constantly or only when triggered. On the other hand, user identities are linked with a user's voice and a language used by the user. To protect the user identities, voice-activated electronic devices are normally used in non-public places that are protected, controlled and intimate spaces (e.g., home and car).

In accordance with some implementations of the invention, a voice-activated electronic device includes a screen configured to provide additional visual information in addition to audio information that can be broadcast via a speaker of the voice-activated electronic device. For example, the electronic device displays caller information (e.g., a caller's name and number) on the screen in response to receiving a voice command to initiate a phone call. The electronic device may play a YouTube video clip on the screen in response to receiving a voice command including identification information of the video clip. The electronic device may display a list of restaurants and their contact information in response to receiving a voice command for conducting a restaurant search. The electronic device may display a map and a suggested route in response to receiving a voice command to identify a route to a destination on a map. The electronic device may display event information of an upcoming event in response to receiving a voice command to review calendar events. The electronic device may display a post that is transcribed from a voice message in response to receiving a voice command to add a post to a social network. The electronic device may display information of a song that is currently being played (e.g., a title, composer and singer of the song, a YouTube link) in response to receiving a voice command to recognize the song.

Specifically, the voice-activated electronic device, when integrated with its own display screen, constitutes a display assistant device. The display assistant device thereby includes a base, a screen and a speaker. The base is configured for sitting on a surface. The screen has a rear surface and is supported by the base at the rear surface. A bottom edge of the screen is configured to be held above the surface by a predefined height, and the base is substantially hidden behind the screen from a front view of the display assistant device (i.e., the base appears to float in air from the front view). The speaker is concealed inside the base and configured to project sound substantially towards the front view of the display assistant device. The display assistant device has a substantially small footprint, and however, a center of mass of the display assistant device is configured to be close to a surface on which the display assistant device sits, thereby allowing the display assistant device to maintain stability at time of being touched or hit. The display assistant device further includes a plurality of mechanical features configured to protect the screen from falling apart from the base and being damaged when the display assistant device hits a floor. That said, the display assistant device provides a low-cost, mechanically robust, and voice-activated user interface solution that has visual display capabilities and supports various voice-activated functions.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

FIG. 1 is an example smart home environment 100 in accordance with some implementations. The smart home environment 100 includes a structure 150 (e.g., a house, office building, garage, or mobile home) with various integrated devices. It will be appreciated that devices may also be integrated into a smart home environment 100 that does not include an entire structure 150, such as an apartment, condominium, or office space. The depicted structure 150 includes a plurality of rooms 152, separated at least partly from each other via walls 154. The walls 154 may include interior walls or exterior walls. Each room may further include a floor 156 and a ceiling 158.

One or more media devices are disposed in the smart home environment 100 to provide media content that is stored at a local content source or streamed from a remote content source (e.g., content host(s) 114). The media devices can be classified to two categories: media output devices 106 that directly output the media content to audience, and cast devices 108 that are networked to stream media content to the media output devices 106. Examples of the media output devices 106 include, but are not limited to television (TV) display devices and music players. Examples of the cast devices 108 include, but are not limited to, set-top boxes (STBs), DVD players and TV boxes. In the example smart home environment 100, the media output devices 106 are disposed in more than one location, and each media output device 106 is coupled to a respective cast device 108 or includes an embedded casting unit. The media output device 106-1 includes a TV display that is hard wired to a DVD player or a set top box 108-1. The media output device 106-2 includes a smart TV device that integrates an embedded casting unit to stream media content for display to its audience. The media output device 106-3 includes a regular TV display that is coupled to a TV box 108-3 (e.g., Google TV or Apple TV products), and such a TV box 108-3 streams media content received from a media content host server 114 and provides an access to the Internet for displaying Internet-based content on the media output device 106-3.

In addition to the media devices 106 and 108, one or more electronic devices 190 are disposed in the smart home environment 100 to collect audio inputs for initiating various media play functions of the media devices. In some implementations, these voice-activated electronic devices 190 (e.g., devices 1901-1, 190-2 and 190-3) are disposed in proximity to a media device, for example, in the same room with the cast devices 108 and the media output devices 106. Alternatively, in some implementations, a voice-activated electronic device 190-4 is disposed in a room having one or more smart home devices but not any media device. Alternatively, in some implementations, a voice-activated electronic device 190 is disposed in a location having no networked electronic device.

The electronic device 190 includes at least one or more microphones, a speaker, a processor and memory storing at least one program for execution by the processor. The speaker is configured to allow the electronic device 190 to deliver voice messages to a location where the electronic device 190 is located in the smart home environment 100, thereby broadcasting music, reporting a state of audio input processing, having a conversation with or giving instructions to a user of the electronic device 190. As an alternative to the voice messages, visual signals could also be used to provide feedback to the user of the electronic device 190 concerning the state of audio input processing. When the electronic device 190 is a conventional mobile device (e.g., a mobile phone or a tablet computer) or has its own display screen, its display screen is configured to display a notification concerning the state of audio input processing.

In accordance with some implementations, the electronic device 190 is a voice interface device that is network-connected to provide voice recognition functions with the aid of a cloud cast service server 116 and/or a voice/display assistance server 112. For example, the electronic device 190 includes a smart speaker that provides music to a user and allows eyes-free and hands-free access to voice assistant service (e.g., Google Assistant). Optionally, the electronic device 190 is one of a desktop or laptop computer, a tablet and a mobile phone that includes a microphone. Optionally, the electronic device 190 is a simple and low cost voice interface device, e.g., a speaker device and a display assistant device (including a display screen having no touch detection capability).

In some implementations, the voice-activated electronic devices 190 includes a display assistant device (e.g., 190-2 and 190-4) that integrates a display screen in addition to the microphones, speaker, processor and memory. The display screen is configured to provide additional visual information in addition to audio information that can be broadcast via the speaker of the voice-activated electronic device 190. When a user is nearby and his or her line of sight is not obscured, the user may review the additional visual information directly on the display screen of the display assistant device. Optionally, the additional visual information provides feedback to the user of the electronic device 190 concerning the state of audio input processing. Optionally, the additional visual information is provided in response to the user's previous voice inputs, and may be related to the audio information broadcast by the speaker. In some implementations, the display screen of the voice-activated electronic devices 190 includes a touch display screen configured to detect touch inputs on its surface. Alternatively, in some implementations, the display screen of the voice-activated electronic devices 190 is not a touch display screen, which is relatively expensive and can compromise the goal of offering the display assistant device 190 as a low cost user interface solution.

When voice inputs from the electronic device 190 are used to control the media output devices 106 via the cast devices 108, the electronic device 190 effectively enables a new level of control of cast-enabled media devices independently of whether the electronic device 190 has its own display. In a specific example, the electronic device 190 includes a casual enjoyment speaker with far-field voice access and functions as a voice interface device for Google Assistant. The electronic device 190 could be disposed in any room in the smart home environment 100. When multiple electronic devices 190 are distributed in multiple rooms, they become audio receivers that are synchronized to provide voice inputs from all these rooms.

Specifically, in some implementations, the electronic device 190 includes a WiFi speaker with a microphone that is connected to a voice-activated personal assistant service (e.g., Google Assistant). A user could issue a media play request via the microphone of electronic device 190, and ask the personal assistant service to play media content on the electronic device 190 itself or on another connected media output device 106. For example, the user could issue a media play request by saying to the WiFi speaker "OK Google, Play cat videos on my Living room TV." The personal assistant service then fulfils the media play request by playing the requested media content on the requested device using a default or designated media application.

A user could also make a voice request via the microphone of the electronic device 190 concerning the media content that has already been played on a display device. In some implementations, closed captions of the currently displayed media content are initiated or deactivated on the display device by voice when there is no remote control or a second screen device is available to the user. Thus, the user can turn on the closed captions on a display device via an eyes-free and hands-free voice-activated electronic device 190 without involving any other device having a physical user interface, and such a voice-activated electronic device 190 satisfies federal accessibility requirements for users having hearing disability. In some implementations, a user may want to take a current media session with them as they move through the house. This requires the personal assistant service to transfer the current media session from a first cast device to a second cast device that is not directly connected to the first cast device or has no knowledge of the existence of the first cast device. Subsequent to the media content transfer, a second output device 106 coupled to the second cast device 108 continues to play the media content previously a first output device 106 coupled to the first cast device 108 from the exact point within a music track or a video clip where play of the media content was forgone on the first output device 106.

In some implementations, in addition to the media devices (e.g., the output devices 106 and the cast devices 108) and the voice-activated electronic devices 190, smart home devices could also be mounted on, integrated with and/or supported by a wall 154, floor 156 or ceiling 158 of the smart home environment 100 (which is also broadly called as a smart home environment in view of the existence of the smart home devices). The integrated smart home devices include intelligent, multi-sensing, network-connected devices that integrate seamlessly with each other in a smart home network and/or with a central server or a cloud-computing system to provide a variety of useful smart home functions. In some implementations, a smart home device is disposed at the same location of the smart home environment 100 as a cast device 108 and/or an output device 106, and therefore, is located in proximity to or with a known distance with respect to the cast device 108 and the output device 106.

The smart home devices in the smart home environment 100 may include, but are not limited to, one or more intelligent, multi-sensing, network-connected thermostats 122, one or more intelligent, network-connected, multi-sensing hazard detectors 124, one or more intelligent, multi-sensing, network-connected entryway interface devices 126 and 128 (hereinafter referred to as "smart doorbells 126" and "smart door locks 128"), one or more intelligent, multi-sensing, network-connected alarm systems 130, one or more intelligent, multi-sensing, network-connected camera systems 132, and one or more intelligent, multi-sensing, network-connected wall switches 136. In some implementations, the smart home devices in the smart home environment 100 of FIG. 1 includes a plurality of intelligent, multi-sensing, network-connected appliances 138 (hereinafter referred to as "smart appliances 138"), such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth.

The smart home devices in the smart home environment 100 may additionally or alternatively include one or more other occupancy sensors (e.g., touch screens, IR sensors, ambient light sensors and motion detectors). In some implementations, the smart home devices in the smart home environment 100 include radio-frequency identification (RFID) readers (e.g., in each room 152 or a portion thereof) that determine occupancy based on RFID tags located on or embedded in occupants. For example, RFID readers may be integrated into the smart hazard detectors 124.

In some implementations, in addition to containing sensing capabilities, devices 122, 124, 126, 128, 130, 132, 136 and 138 (which are collectively referred to as "the smart home devices" or "the smart home devices 120") are capable of data communications and information sharing with other smart home devices, a central server or cloud-computing system, and/or other devices (e.g., the client device 104, the cast devices 108 and the voice-activated electronic devices 190) that are network-connected. Similarly, each of the cast devices 108 and the voice-activated electronic devices 190 is also capable of data communications and information sharing with other cast devices 108, voice-activated electronic devices 190, smart home devices, a central server or cloud-computing system 140, and/or other devices (e.g., the client device 104) that are network-connected. Data communications may be carried out using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the cast devices 108, the electronic devices 190 and the smart home devices serve as wireless or wired repeaters. In some implementations, a first one of and the cast devices 108 communicates with a second one of the cast devices 108 and the smart home devices 120 via a wireless router. The cast devices 108, the electronic devices 190 and the smart home devices 120 may further communicate with each other via a connection (e.g., network interface 160) to a network, such as the Internet 110. Through the Internet 110, the cast devices 108, the electronic devices 190 and the smart home devices 120 may communicate with a smart server system 140 (also called a central server system and/or a cloud-computing system herein). Optionally, the smart server system 140 may be associated with a manufacturer, support entity, or service provider associated with the cast devices 108 and the media content displayed to the user.

Accordingly, the smart server system 140 may include a voice/display assistance server 112 that processes audio inputs collected by voice-activated electronic devices 190, one or more content hosts 114 that provide the displayed media content, a cloud cast service server 116 creating a virtual user domain based on distributed device terminals, and a device registry 118 that keeps a record of the distributed device terminals in the virtual user environment. Examples of the distributed device terminals include, but are not limited to, the voice-activated electronic devices 190, cast devices 108, media output devices 106 and smart home devices 122-138. In some implementations, these distributed device terminals are linked to a user account (e.g., a Google user account) in the virtual user domain.

In some implementations, the network interface 160 includes a conventional network device (e.g., a router). The smart home environment 100 of FIG. 1 further includes a hub device 180 that is communicatively coupled to the network(s) 110 directly or via the network interface 160. The hub device 180 is further communicatively coupled to one or more of the above intelligent, multi-sensing, network-connected devices (e.g., the cast devices 108, the electronic devices 190, the smart home devices and the client device 104). Each of these network-connected devices optionally communicates with the hub device 180 using one or more radio communication networks available at least in the smart home environment 100 (e.g., ZigBee, Z-Wave, Insteon, Bluetooth, Wi-Fi and other radio communication networks). In some implementations, the hub device 180 and devices coupled with/to the hub device can be controlled and/or interacted with via an application running on a smart phone, household controller, laptop, tablet computer, game console or similar electronic device. In some implementations, a user of such controller application can view status of the hub device or coupled network-connected devices, configure the hub device to interoperate with devices newly introduced to the home network, commission new devices, and adjust or view settings of connected devices, etc.

Figure 2A:
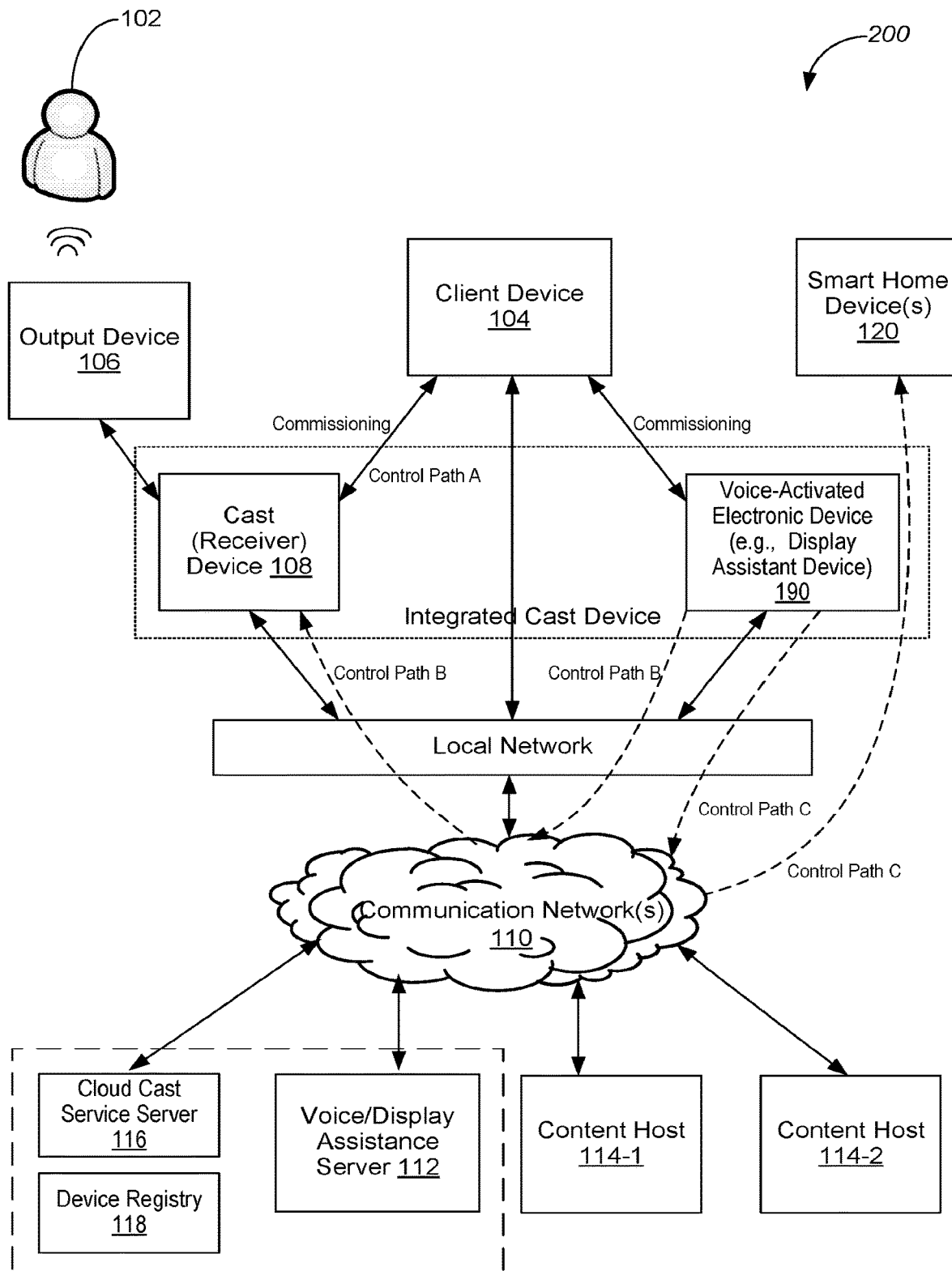
FIG. 2A is an example operating environment in which a voice-activated electronic device (e.g., a display assistant device) interacts with a cast device, a client device or a server system of a smart home environment in accordance with some implementations.

FIG. 2A is an example operating environment 200 in which a voice-activated electronic device 190 (e.g., a display assistant device) interacts with a cast device 108, a client device 104 or a server system 140 of a smart home environment 100 in accordance with some implementations. The voice-activated electronic device 190 is configured to receive audio inputs from an environment in proximity to the voice-activated electronic device 190. Optionally, the electronic device 190 stores the audio inputs and at least partially processes the audio inputs locally. Optionally, the electronic device 190 transmits the received audio inputs or the partially processed audio inputs to a voice/display assistance server 112 via the communication networks 110 for further processing. The cast device 108 is configured to obtain media content or Internet content from one or more content hosts 114 for display on an output device 106 coupled to the cast device 108. As explained above, the cast device 108 and the voice-activated electronic device 190 are linked to each other in a user domain, and more specifically, associated with each other via a user account in the user domain. Information of the cast device 108 and information of the electronic device 190 are stored in the device registry 118 in association with the user account.

In some implementations, the cast device 108 does not include any display screen, and the voice-activated electronic device 190 includes a display assistant device that has a display screen. Both the cast device 108 and the display assistant device 190 have to rely on the client device 104 to provide a user interface during a commissioning process. Specifically, the client device 104 is installed with an application that enables a user interface to facilitate commissioning of a new cast device 108 or a new display assistant device 190 disposed in proximity to the client device 104. A user may send a request on the user interface of the client device 104 to initiate a commissioning process for the new cast device 108 or display assistant device 190 that needs to be commissioned. After receiving the commissioning request, the client device 104 establishes a short range communication link with the new cast device 108 or display assistant device 190 that needs to be commissioned. Optionally, the short range communication link is established based near field communication (NFC), Bluetooth, Bluetooth Low Energy (BLE) and the like. The client device 104 then conveys wireless configuration data associated with a wireless local area network (WLAN) to the new cast device 108 or display assistant device 190. The wireless configuration data includes at least a WLAN security code (i.e., service set identifier (SSID) password), and optionally includes an SSID, an Internet protocol (IP) address, proxy configuration and gateway configuration. After receiving the wireless configuration data via the short range communication link, the new cast device 108 or display assistant device 190 decodes and recovers the wireless configuration data, and joins the WLAN based on the wireless configuration data.

Additional user domain information is entered on the user interface displayed on the client device 104, and used to link the new cast device 108 or display assistant device 190 to an account in a user domain. Optionally, the additional user domain information is conveyed to the new cast device 108 or display assistant device 190 in conjunction with the wireless communication data via the short range communication link. Optionally, the additional user domain information is conveyed to the new cast device 108 or display assistant device 190 via the WLAN after the new device has joined the WLAN.

Once the cast device 108 and display assistant device 190 have been commissioned into the user domain, the cast device 108, the output device 106 and their associated media play activities could be controlled via two control paths (control path A and control path B). In accordance with control path A, a cast device application or one or more media play applications installed on the client device 104 are used to control the cast device 108 and its associated media play activities. Alternatively, in accordance with control path B, the display assistant device 190 is used to enable eyes-free and hands-free control of the cast device 108 and its associated media play activities (e.g., playback of media content play on the output device 106).

In some implementations, the cast device 108 and display assistant device 190 are two distinct and different devices that are configured to act as a cast receiver device and a cast transmitter device, respectively. The display assistant device 190 can provide information or content (which is generated locally or received from another source) to be projected onto the output device 106 via the cast device 108. Alternatively, in some implementations, the cast device 108 and display assistant device 190 are combined in an integrated cast device that is coupled to the output device 106.

In some situations, the smart home environment 100 includes one or more smart home devices 220 (e.g., thermostats 122, hazard detectors 124, doorbells 126, door locks 128, alarm systems 130, camera systems 132, wall switches 136 and smart appliances 138 in FIG. 1). Regardless of whether a smart home device 220 has a display screen, it can rely on the client device 104 to provide a user interface during a commissioning process. Specifically, the client device 104 is installed with a smart device application that enables a user interface to facilitate commissioning of a new smart home device 120. Like a new cast device 108 or display assistant device 190, the new smart home device 120 can establish a short range communication link with the client device 104, and the wireless configuration data are communicated to the new smart home device 120 via the short range communication link, allowing the smart home device 120 to join the WLAN based on the wireless configuration data. Further, the smart home device 120 is optionally linked to the account of the user domain to which the cast device 108 and display assistant device 190 are linked as well. Once the smart home device 120 and the display assistant device 190 have been commissioned into the user domain, the smart home device 120 could be monitored and controlled via the display assistant device 190 in accordance with Control Path C as the cast device 108 is controlled via the display assistant device 190 in accordance with Control Path B. For example, voice commands can be inputted into the display assistant device 190 to review recording of an outdoor camera 132 mounted next to a door and control a door lock 128 based on security events detected in the recordings.

Referring to FIG. 2A, after the cast device 108 and the voice-activated electronic device 190 are both commissioned and linked to a common user domain, the voice-activated electronic device 190 can be used as a voice user interface to enable eyes-free and hands-free control of media content streaming to the cast device 108 involving no remote control, client device 104 or other second screen device. For example, the user may give voice commands such as "Play Lady Gaga on Living Room speakers." A Lady Gaga music track or video clip is streamed to a cast device 108 associated with the "Living Room speakers." The client device 104 is not involved, nor is any cast device application or media play application loaded on the client device 104.

The cloud cast service 116 is the proxy service that communicatively links the voice-activated electronic device 190 to the cast device 108 and makes casting to the cast device 108 possible without involving any applications on the client device 104. For example, a voice message is recorded by an electronic device 190, and the voice message is configured to request media play on a media output device 106. Optionally, the electronic device 190 partially processes the voice message locally. Optionally, the electronic device 190 transmits the voice message or the partially processed voice message to a voice/display assistance server 112 via the communication networks 110 for further processing. A cloud cast service server 116 determines that the voice message includes a first media play request, and that the first media play request includes a user voice command to play media content on a media output device 106 and a user voice designation of the media output device 106. The user voice command further includes at least information of a first media play application (e.g., YouTube and Netflix) and the media content (e.g., Lady Gaga music) that needs to be played.

In accordance with the voice designation of the media output device, the cloud cast service server 116 in a device registry 118 a cast device associated in the user domain with the electronic device 190 and coupled to the media output device 106. The cast device 108 is configured to execute one or more media play applications for controlling the media output device 106 to play media content received from one or more media content hosts 114. Then, the cloud cast service server 116 sends to the cast device 108 a second media play request including the information of the first media play application and the media content that needs to be played. Upon receiving the information sent by the cloud cast service server 116, the cast device 108 executes the first media play application and controls the media output device 106 to play the requested media content.

In some implementations, the user voice designation of the media output device 106 includes description of the destination media output device. The cloud cast service server 116 identifies in the registry the destination media output device among a plurality of media output devices according to the description of the destination media output device. In some implementations, the description of the destination media output device includes at least a brand ("Samsung TV") or a location of the media output device 106 ("my Living Room TV").

Figure 2B:
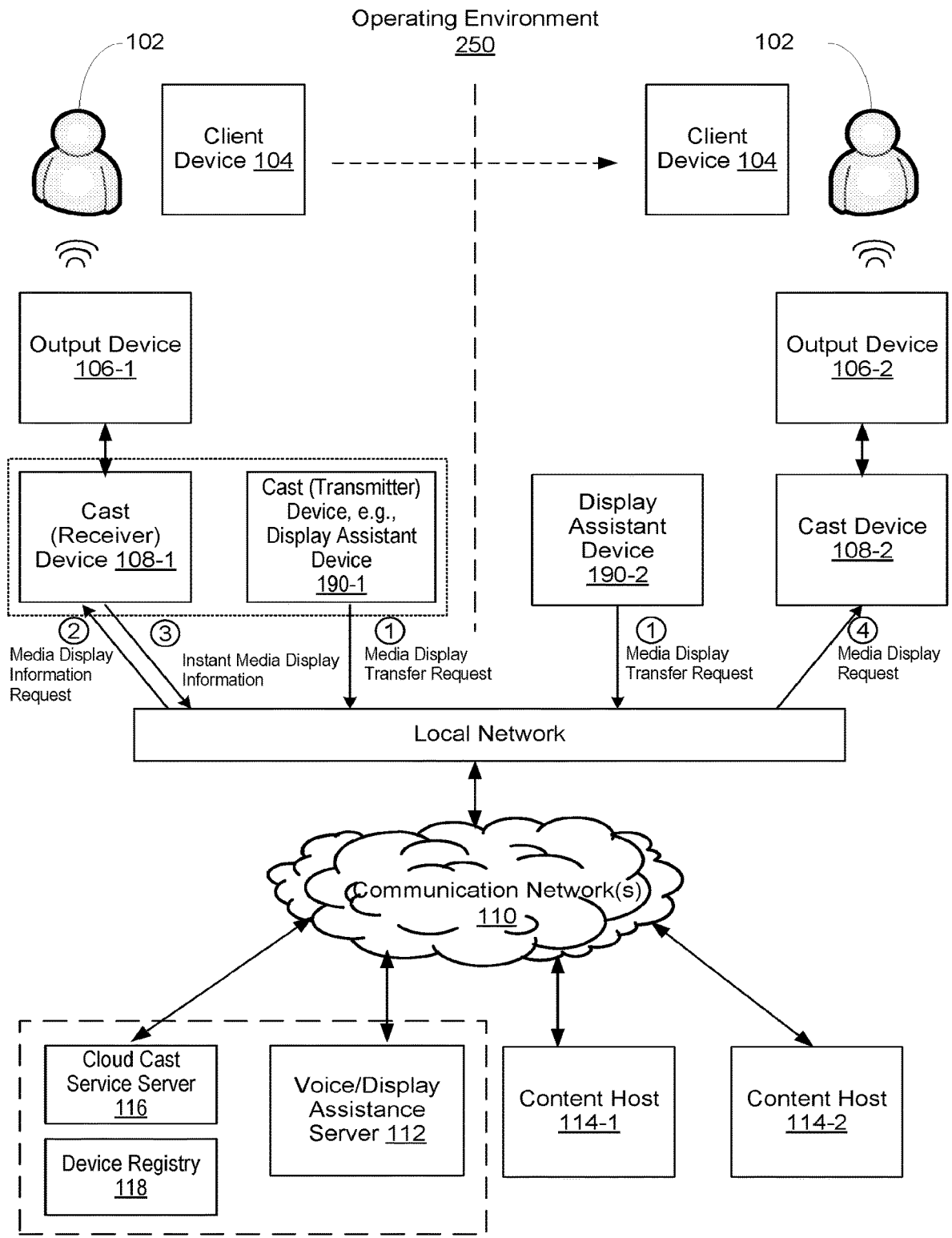
FIG. 2B is another example operating environment in which voice-activated electronic devices interact with cast devices, client devices or a server system of a smart home environment in accordance with some implementations.

FIG. 2B is another example operating environment 250 in which voice-activated electronic devices interact with cast devices 106, client devices 104 or a server system 140 of a smart home environment 100 in accordance with some implementations. The smart home environment 100 includes a first cast device 108-1 and a first output device 106-1 coupled to the first cast device 108-1. The smart home environment 100 also includes a second cast device 108-2 and a second output device 106-2 coupled to the second cast device 108-2. The cast devices 108-1 and 108-2 are optionally located in the same location (e.g., the living room) or two distinct locations (e.g., two rooms) in the smart home environment 100. Each of the cast devices 108-1 and 108-2 is configured to obtain media or Internet content from media hosts 114 for display on the output device 106 coupled to the respective cast device 108-1 or 108-2. Both the first and second cast devices are communicatively coupled to the cloud cast service server 116 and the content hosts 114.

The smart home environment 100 further includes one or more voice-activated electronic devices 190 that are communicatively coupled to the cloud cast service server 116 and the voice/display assistance server 112. The one or more voice-activated electronic devices 190 includes at least one display assistant device (e.g., display assistant device 190-2). In some implementations, the voice-activated electronic devices 190 are disposed independently of the cast devices 108 and the output devices 106. For example, as shown in FIG. 1, the electronic device 190-4 is disposed in a room where no cast device 108 or output device 106 is located. In some implementations, the first electronic device 190-1 is disposed in proximity to the first cast device 108-1 and the first output device 106-1, e.g., the first electronic device 190-1, the first cast device 108-1 and the first output device 106-1 are located in the same room. Optionally, the second electronic device 190-2 is disposed independently of or in proximity to the second cast device 108-2 and the second output device 106-2.

When media content is being played on the first output device 106-1, a user may send a voice command to any of the electronic devices 190 (e.g., 190-1 or 190-2 in FIG. 2B) to request play of the media content to be transferred to the second output device 106-2. The voice command includes a media play transfer request. The voice command is transmitted to the cloud cast service server 116. The cloud cast service server 116 sends a media display information request to the first cast device 108-1 to request instant media play information of the media content that is currently being played on the first output device 106-1 coupled to the first cast device 108-1. The first cast device 108-1 then returns to the cloud cast service server 116 the requested instant play information including at least information of a first media play application (e.g., YouTube), the media content that is currently being played (e.g., "Lady Gaga—National Anthem—Super Bowl 2016"), and a temporal position related to playing of the media content. The second cast device 108-2 then receives a media display request including the instant play information from the cloud cast service server 116, and in accordance with the instant play information, executes the first media play application that controls the second output device 106-2 to play the media content from the temporal location.

Figure 3:
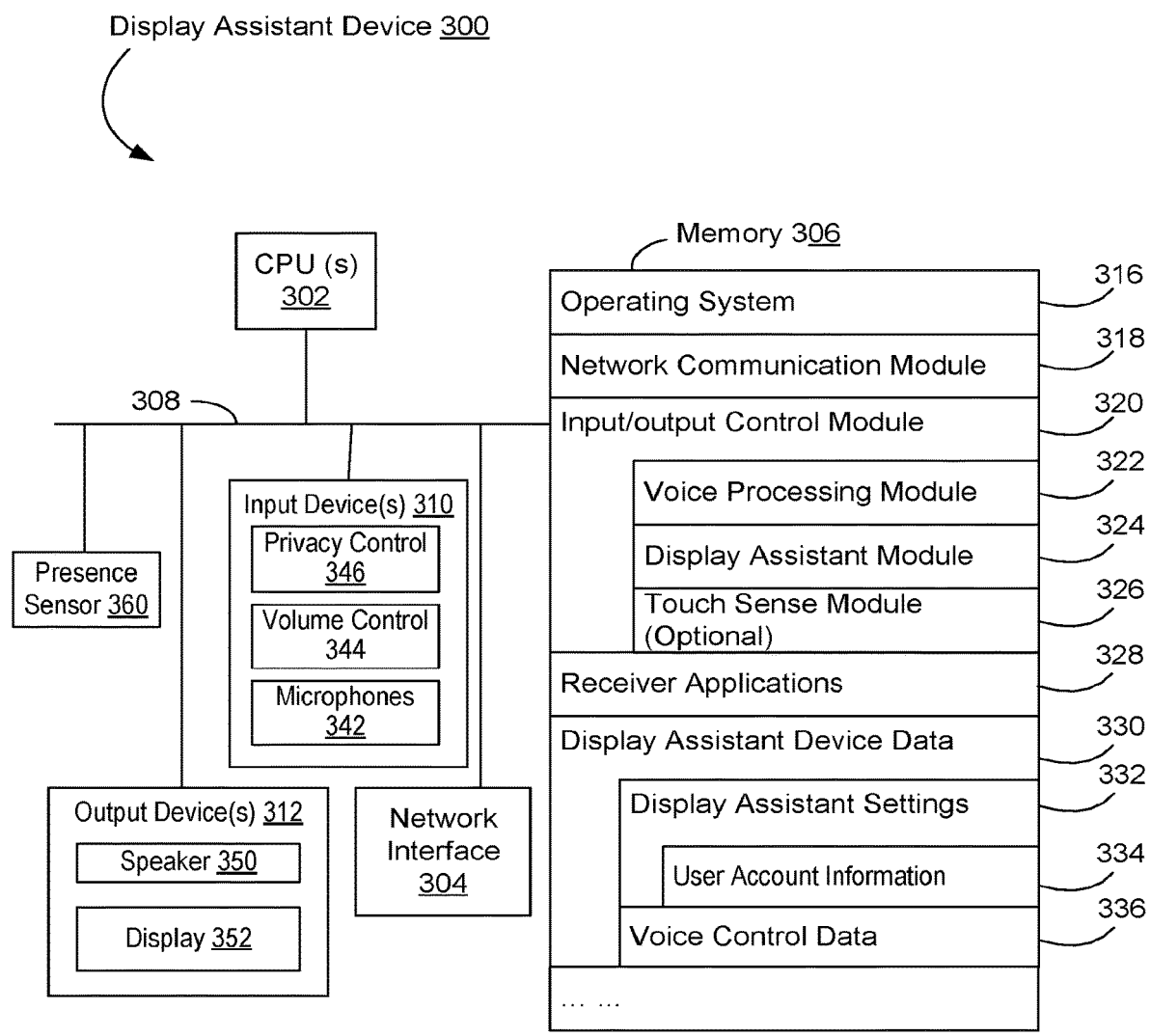
FIG. 3 is a block diagram illustrating an example display assistant device that is applied as a voice interface to collect user voice commands in a smart home environment in accordance with some implementations.

FIG. 3 is a block diagram illustrating an example display assistant device 300 that is applied as a voice interface to collect user voice commands in a smart home environment 100 in accordance with some implementations. The display assistant device 300 typically includes one or more processing units (CPUs) 302, one or more network interfaces 304, memory 306, and one or more communication buses 308 for interconnecting these components (sometimes called a chipset). The display assistant device 300 includes one or more output devices 312, including one or more speakers 350 and a display 352. The display assistant device 300 also includes one or more input devices 310 that facilitate user input, including one or more microphones 342, a volume control 344 and a privacy control 346. The volume control 344 is configured to receive a user action (e.g., a press on a volume up button or a volume down button, a press on both volumes up and down buttons for an extended length of time) that controls a volume level of the speakers 350 or resets the display assistant device 300. The privacy control 346 is configured to receive a user action that controls privacy settings of the display assistant device (e.g., whether to deactivate the microphones 342). In some implementations, the input devices 310 of the display assistant device 300 include a touch detection module (not shown in FIG. 3) that is integrated on the display panel 352 and configured to detect touch inputs on its surface. In some implementations, the input devices 310 of the display assistant device 300 include a camera module configured to capture a video stream of a field of view. Alternatively, in some implementations, the input devices 310 of the display assistant device 300 does not include any camera or touch detection module, because they relatively expensive and can compromise the goal of offering the display assistant device 300 as a low cost user interface solution.

In some implementations, the display assistant device 300 further includes a presence sensor 360 configured to detect a presence of a user in a predetermined area surrounding the display assistant device 300. Under some circumstances, the display assistant device 300 operates at a sleep or hibernation mode that deactivates detection and processing of audio inputs, and does not wake up from the sleep or hibernation mode or listen to the ambient (i.e., processing audio signals collected from the ambient) until the presence sensor 360 detects a presence of a user in the predetermined area. An example of the presence sensor 360 is an ultrasonic sensor configured to detect a presence of a user.

Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

- Operating system 316 including procedures for handling various basic system services and for performing hardware dependent tasks;
- Network communication module 318 for connecting the display assistant device 300 to other devices (e.g., the server system 140, the cast device 108, the client device 104, the smart home devices 120 and the other voice-activated electronic device(s) 190) via one or more network interfaces 304 (wired or wireless) and one or more networks 110, such as the Internet, other wide area networks, local area networks, metropolitan area networks, and so on;
- Input/output control module 320 for receiving inputs via one or more input devices 310 enabling presentation of information at the display assistant device 300 via one or more output devices 312, including:
  - Voice processing module 322 for processing audio inputs or voice messages collected in an environment surrounding the display assistant device 300, or preparing the collected audio inputs or voice messages for processing at a voice/display assistance server 112 or a cloud cast service server 116;
  - Display assistant module 324 for displaying additional visual information including but not limited to a media content item (e.g., a YouTube video clip), news post, social media message, weather information, personal picture, a state of audio input processing, and readings of smart home devices; and
  - Touch sense module 326 for sensing touch events on a top surface of the display assistant device 300; and
- One or more receiver application 328 for responding to user commands extracted from audio inputs or voice messages collected in an environment surrounding the display assistant device 300, including but not limited to, a media play application, an Internet search application, a social network application and a smart device application;
- Display assistant device data 330 storing at least data associated with the display assistant device 300, including:
  - Display assistant settings 332 for storing information associated with the display assistant device 300 itself, including common device settings (e.g., service tier, device model, storage capacity, processing capabilities, communication capabilities, etc.) and information of a user account 334 in a virtual user domain to which the display assistant device 300 is linked; and
  - Voice control data 336 for storing audio signals, voice messages, response messages and other data related to voice interface functions of the display assistant device 300.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

Figure 4:
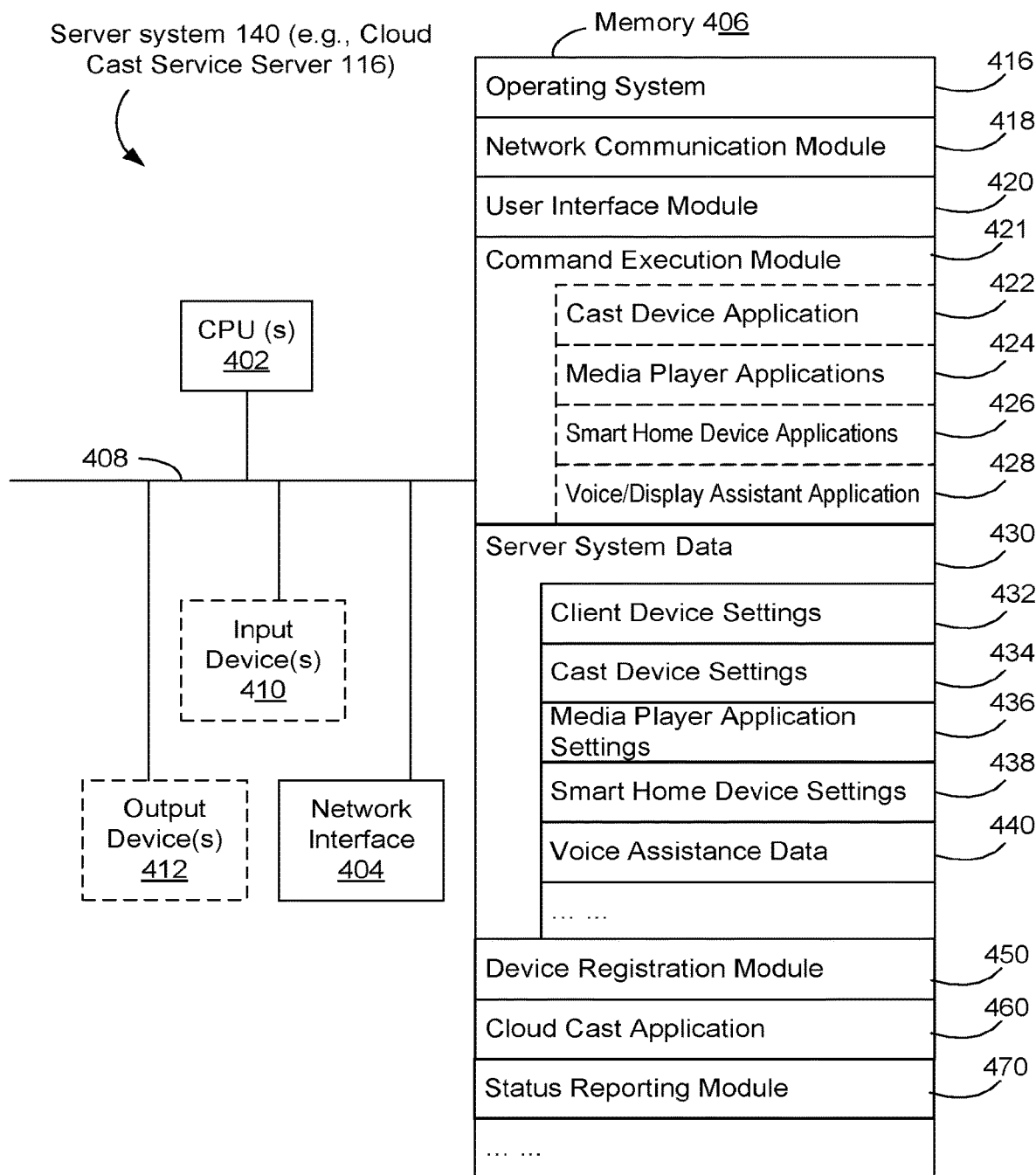
FIG. 4 is a block diagram illustrating an example server in the server system 140 of a smart home environment in accordance with some implementations.

FIG. 4 is a block diagram illustrating an example server in the server system 140 of a smart home environment 100 in accordance with some implementations. An example server is one of a cloud cast service sever 116. The server system 140, typically, includes one or more processing units (CPUs) 402, one or more network interfaces 404, memory 406, and one or more communication buses 408 for interconnecting these components (sometimes called a chipset). The server system 140 could include one or more input devices 410 that facilitate user input, such as a keyboard, a mouse, a voice-command input unit or microphone, a touch screen display, a touch-sensitive input pad, a gesture capturing camera, or other input buttons or controls. Furthermore, the server system 140 could use a microphone and voice recognition or a camera and gesture recognition to supplement or replace the keyboard. In some implementations, the server system 140 includes one or more cameras, scanners, or photo sensor units for capturing images, for example, of graphic series codes printed on the electronic devices. The server system 140 could also include one or more output devices 412 that enable presentation of user interfaces and display content, including one or more speakers and/or one or more visual displays.

Memory 406 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 406, optionally, includes one or more storage devices remotely located from one or more processing units 402. Memory 406, or alternatively the non-volatile memory within memory 406, includes a non-transitory computer readable storage medium. In some implementations, memory 406, or the non-transitory computer readable storage medium of memory 406, stores the following programs, modules, and data structures, or a subset or superset thereof:
  Operating system 416 including procedures for handling various basic system services and for performing hardware dependent tasks;
  Network communication module 418 for connecting the server system 140 to other devices (e.g., various servers in the server system 140, the client device 104, the cast device 108, and the smart home devices 120) via one or more network interfaces 404 (wired or wireless) and one or more networks 110, such as the Internet, other wide area networks, local area networks, metropolitan area networks, and so on;
  User interface module 420 for enabling presentation of information (e.g., a graphical user interface for presenting applications, widgets, websites and web pages thereof, and/or games, audio and/or video content, text, etc.) at the client device 104;
  Command execution module 421 for execution on the server side (e.g., games, social network applications, smart home applications, and/or other web or non-web based applications for controlling the client device 104, the cast devices 108, the voice activated electronic device 190 (e.g., a display assistant device 300) and the smart home devices 120 and reviewing data captured by such devices), including one or more of:
    a cast device application 422 that is executed to provide server-side functionalities for device provisioning, device control, and user account management associated with cast device(s) 108;
    one or more media player applications 424 that is executed to provide server-side functionalities for media display and user account management associated with corresponding media sources;
    one or more smart home device applications 426 that is executed to provide server-side functionalities for device provisioning, device control, data processing and data review of corresponding smart home devices 120; and
    a voice/display assistant application 428 that is executed to arrange voice processing of a voice message received from a voice-activated electronic device 190, directly process the voice message to extract a user voice command and a designation of a cast device 108 or another voice-activated electronic device 190, and/or enable a voice-activated electronic device 190 to play media content (audio or video); and
  Server system data 430 storing at least data associated with automatic control of media display (e.g., in an automatic media output mode and a follow-up mode), including one or more of:
    Client device settings 432 for storing information associated with the client device 104, including common device settings (e.g., service tier, device model, storage capacity, processing capabilities, communication capabilities, etc.), and information for automatic media display control;
    Cast device settings 434 for storing information associated with user accounts of the cast device application 422, including one or more of account access information, information for device settings (e.g., service tier, device model, storage capacity, processing capabilities, communication capabilities, etc.), and information for automatic media display control;
    Media player application settings 436 for storing information associated with user accounts of one or more media player applications 424, including one or more of account access information, user preferences of media content types, review history data, and information for automatic media display control;
    Smart home device settings 438 for storing information associated with user accounts of the smart home applications 426, including one or more of account access information, information for one or more smart home devices 120 (e.g., service tier, device model, storage capacity, processing capabilities, communication capabilities, etc.); and
    Voice assistance data 440 for storing information associated with user accounts of the voice/display assistant application 428, including one or more of account access information, information for one or more display assistant devices 190 (e.g., service tier, device model, storage capacity, processing capabilities, communication capabilities, etc.).

When the server system 140 includes a cloud cast service server 116, memory 406, or the non-transitory computer readable storage medium of memory 406, stores the following programs, modules, and data structures, or a subset or superset thereof:

Device registration module 450 for managing the device registry 118 coupled to the cloud cast service server 116;

Cloud cast application 460 for relaying a user voice command identified in a voice message to one or more of the cast device(s) 180, the electronic device(s) 190 and the smart home device(s) 120 that are coupled in a cloud cast user domain; and Status reporting module 470 for maintaining the states of the cast device(s) 180, the electronic device(s) 190 and the smart home device(s) 120 that are coupled in a cloud cast user domain.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 406, optionally, stores a subset of the modules and data structures identified above. Furthermore, memory 406, optionally, stores additional modules and data structures not described above.

Figure 5A:
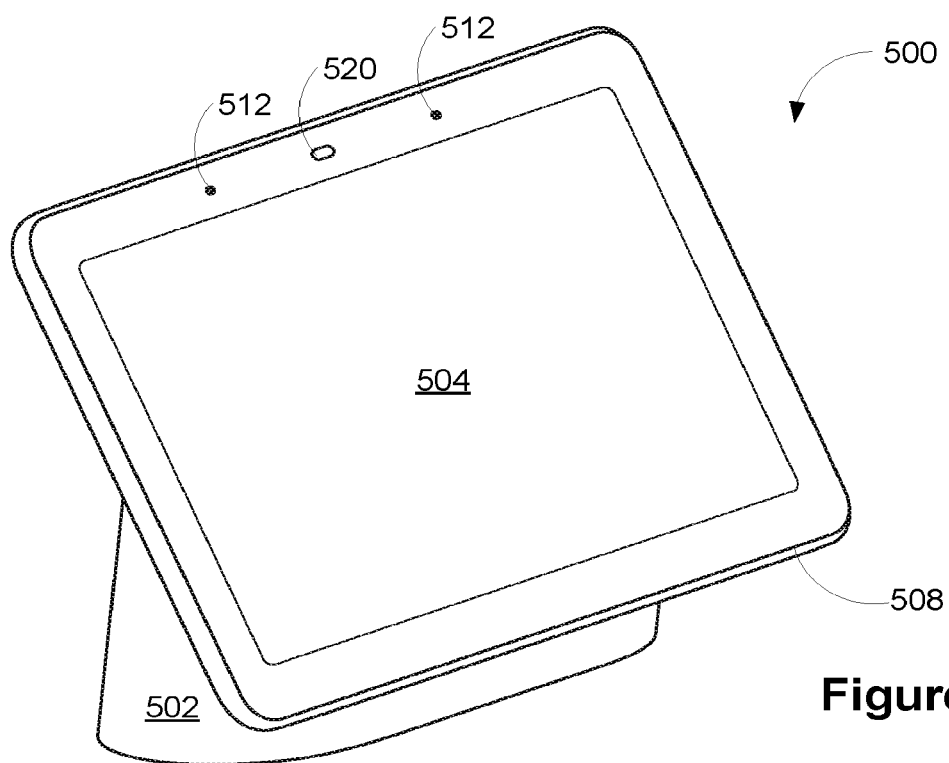
FIGS. 5A-5F are a perspective view, a front view, a rear view, a side view, a top view and a bottom view of a display assistant device in accordance with some implementations, respectively.
Figure 5B:
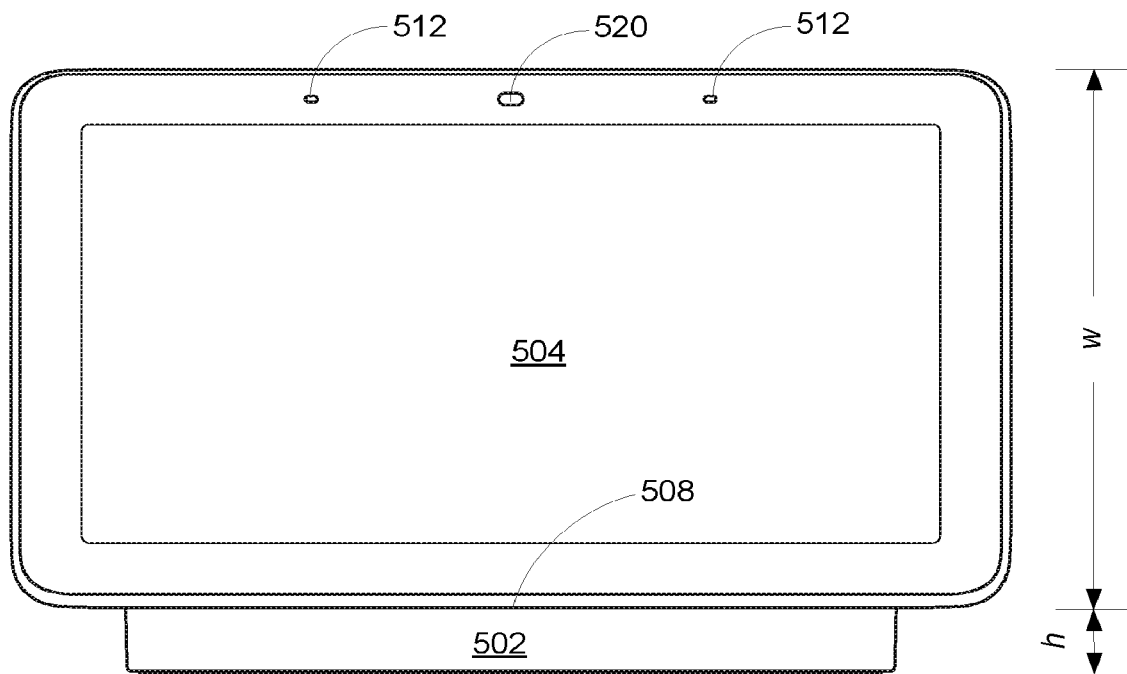

FIGS. 5A-5E are a perspective view, a front view, a rear view, a side view, a top view and a bottom view of a display assistant device 500 in accordance with some implementations, respectively. The display assistant device 500 includes a base 502 and a screen 504. The base 502 is configured for sitting on a surface. The screen 504 has a rear surface 506 at which the screen 504 is supported by the base. A bottom edge 508 of the screen 504 is configured to be held above the surface by a predefined height h. Referring to FIG. 5B, the base 502 is substantially hidden behind the screen 504 from the front view of the display assistant device 500. That said, the predefined height h is less than a predetermined threshold (e.g., 15 mm), such that the screen 504 appears to float in air and the base 502 can be substantially hidden behind the screen 504 from the front view of the display assistant device. In an example, the predetermined threshold is 10% of a width w of the screen 504. If the screen 504 is a seven-inch screen having a width of 5 inch, the bottom edge 508 of the screen 504 is held above the surface by a height of 12.7 mm or below.

Figure 5C:
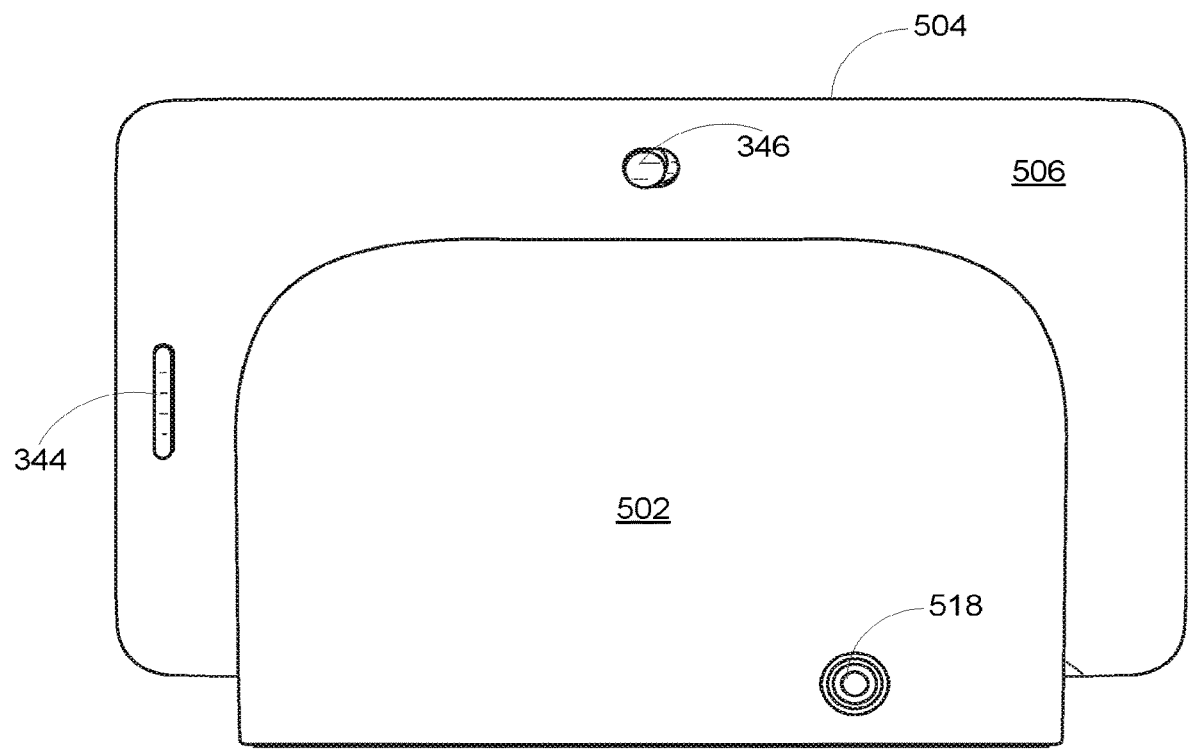
Figure 5D:
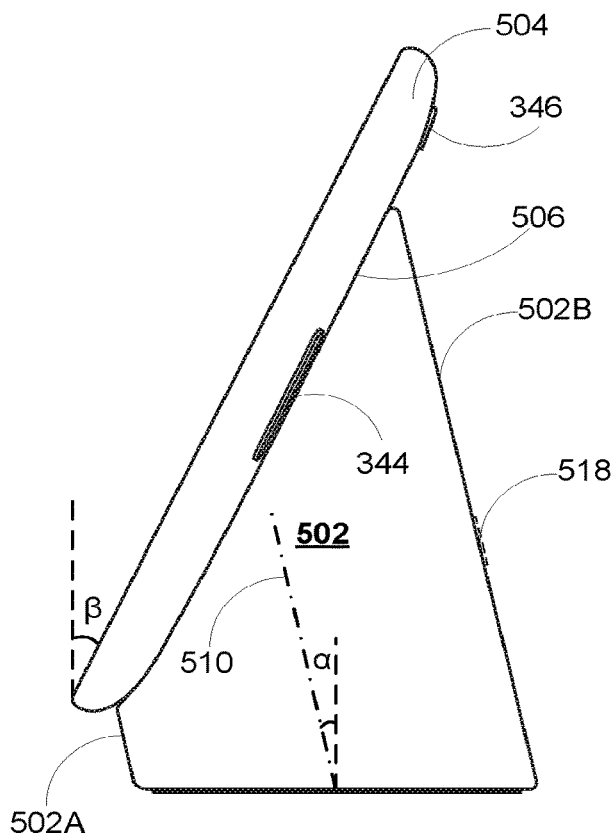
Figure 5E:
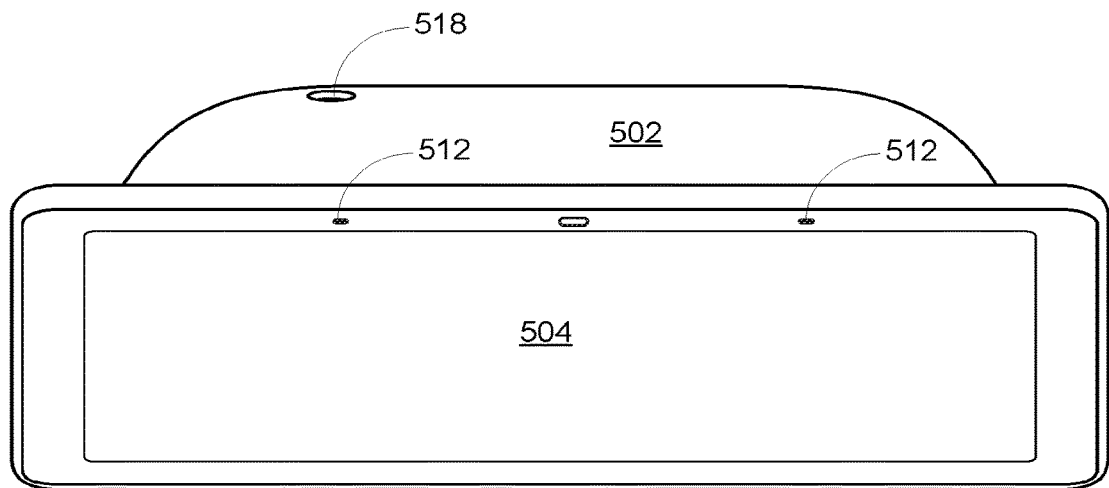
Figure 5F:
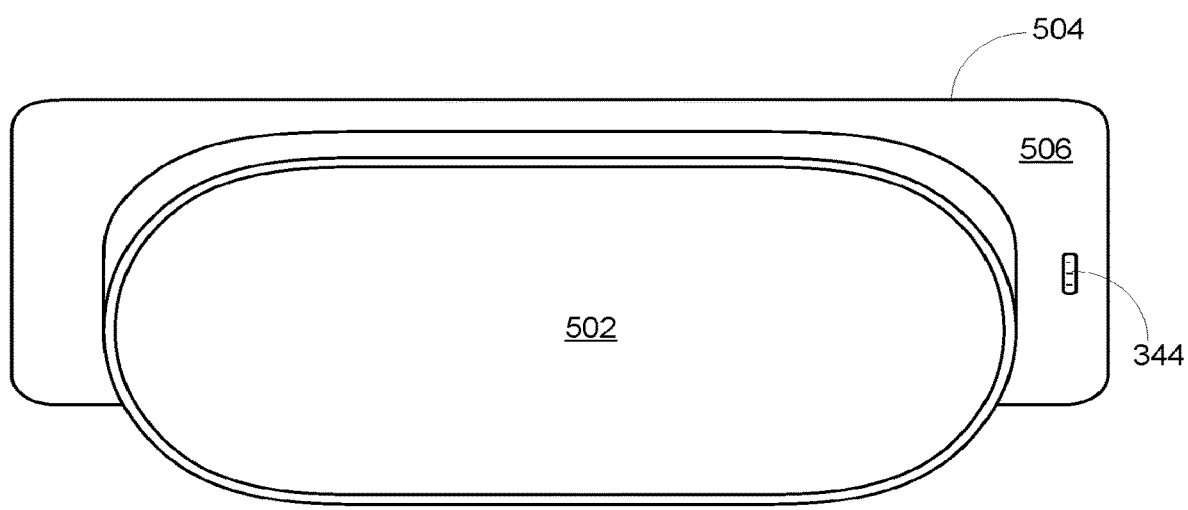

Referring to FIG. 5D, in some implementations, the base 502 extends along a central axis 510, and the central axis 510 of the base 502 is not perpendicular to the surface when the base 502 sits on the surface. Optionally. the base 502 has a front surface 502A and a rear surface 502B both of which are parallel with the central axis 510. The central axis 510, front surface 502A and rear surface 502B of the base 502 lean forward by a base angle α when the base sits on the surface. It is noted that the front surface 502A of the base is shorter than the rear surface 502B of the base, e.g., a height of the front surface 502A is only 20% of that of the rear surface 502B. When the screen 504 is supported by the base 502 at its rear surface 506, the screen 504 is not perpendicular to the surface, but faces substantially forward and leans slightly backward by a screen angle β for the purposes of providing a desirable viewing angle for an average user. In an example, both the base angle α and the screen angle β are equal to 15 degrees, except that the base leans forward by the base angle α of 15 degrees and the screen leans backward by the screen angle β of 15 degrees. By these means, the display assistant device 500 does not tip over (forward or backward) easily when a blunt force F hits a top edge of the display assistant device 500 or a user touch occurs to the screen 202 of the display assistant device 500.

The base 502 acts as a speaker box. A speaker is concealed inside the base and configured to project sound substantially towards the front view of the display assistant device, i.e., through a space of the predefined height h separating the bottom edge 508 of the screen 504 and the surface on which the display assistant device 500 is configured to sit.

Referring to FIG. 5B, the display assistant device 500 has a substantially narrow bezel area surrounding an active display area of the screen 504. The bezel area is optionally white and has a bezel width less than a threshold width (e.g., a fixed value of 5 mm or 5% of the screen width w). In some implementations, the active display area has a plurality of rounded corners. The rounded corners are formed when white paint is applied on a rear surface of a cover glass to define the active display area. In some implementations, an array of display pixels that are visible via a transparent portion of the cover glass are also rounded, i.e., a subset of display pixels that are outside the rounded corners are not driven to display any color and brightness information that varies with time.

In some implementations, the bezel area includes one or more microphone holes 512. One or more microphones 342 are placed behind the microphone holes 512 and configured to collect sound from the ambient of the display assistant device 500. In some implements, the display assistant device 500 further includes a sensor opening 520 configured to access an ambient light sensor and/or a RGB color sensor (e.g., 736 in FIG. 7A). The ambient light sensor or RGB color sensor is configured to detect a light condition in the smart home environment 100 where the display assistant device 500 sits. In some implementations, the display assistant device 500 is configure to adjust a brightness level and/or a color tone of its screen 504 according to the light condition. The ambient light sensor and the RGB color sensor are disposed behind the bezel area and exposed to light via transparent part of the bezel area, e.g., the sensor opening 520.

Referring to FIG. 5C, the display assistant device 500 further includes a volume control 344, a privacy control 346 and a power adaptor interface 518. In this example, the volume control button 514 and privacy control 346 are disposed on the rear surface 506 of the screen 504, and the power adaptor interface 518 is disposed on the rear surface 502B of the base 502. The volume control 344 includes a mechanical assembly (e.g., a button, a knob, a switch) configure to receive a user input for adjusting a volume level of the speaker in the display assistant device 500. In an example, the volume control 344 includes two buttons (separated or connected) configured to initiate an increase or decrease of the volume level of the speaker, respectively. In some implementations, the two buttons of the volume control 344 can be pressed concurrently to reset the display assistant device 500, independently of controlling the volume level of the speaker. It is noted that the volume control 344 is not disposed on any edge of the screen 504 of the display assistant device 500. Rather, the volume control 344 is arranged on the rear surface 506 of the screen 504 and has a predefined distance from a short edge of the screen 504, such that when a user grabs the display assistant device 500 by the short edge of the screen 504, the volume control 344 is readily accessible for fingers of the user.

Further, the privacy control 346 disposed on the rear surface 506 is configured to provide privacy protection to a user of the display assistant device 500. For example, the privacy control 346 can mute one or more microphones 342 of the display assistant device 500, disables a camera if there is one in the display assistant device 500, disconnects the display assistant device 500 from the Internet while keeping the display assistant device coupled in a local area network, and/or disconnects the display assistant device from all communication networks available to the display assistant device 500. The type of privacy protection enabled by the privacy control 346 could change according to an identify of a person associated with the display assistant device 500 and/or or a time of a specific moment. More details on functions of the privacy control 346 are provided below with reference to FIG. 6.

In this implementation, the power adaptor interface 518 of the display assistant device 500 is disposed on the rear surface 502B of the base 502. The power adaptor interface 518 includes a female connector to receive a male connector configured to connect the display assistant device 500 to an external power source (e.g., a direct current power source). The display assistant device 500 further includes a power board hidden in the base 502. The power board is electrically coupled to the power adaptor interface 518 and configured to drive the display assistant device 500 with the external power source. In some implementations, the display assistant device 500 has to be constantly connected to the external power source, and is powered off when the external power source is disconnected. Alternatively, in some implementations, the power board includes a rechargeable battery. The rechargeable battery is configured to be charged with the external power source, and drive the display assistant device 500 temporarily when the external power source is disconnected from the display assistant device 500.

A bottom surface of the base 502 constitutes a footprint of the display assistant device 500. A length of the bottom surface of the base 502 is smaller than (e.g., 75% of) a length of the screen 504, and a width of the bottom surface of the base 502 is significant smaller than (e.g., <40% of) a width w of the screen 504. As a result, the footprint of the display assistant device 500 is substantially small, and the display assistant device 500 can therefore fit into different physical settings (e.g., a kitchen, living room and bedroom) in the smart home environment 100. It is noted that FIGS. 5A-5D are focused on an overall look and mechanical features of the display assistant device 500. More details on functions of the display assistant device 500 are described above with reference to FIGS. 1-4.

Figure 6:
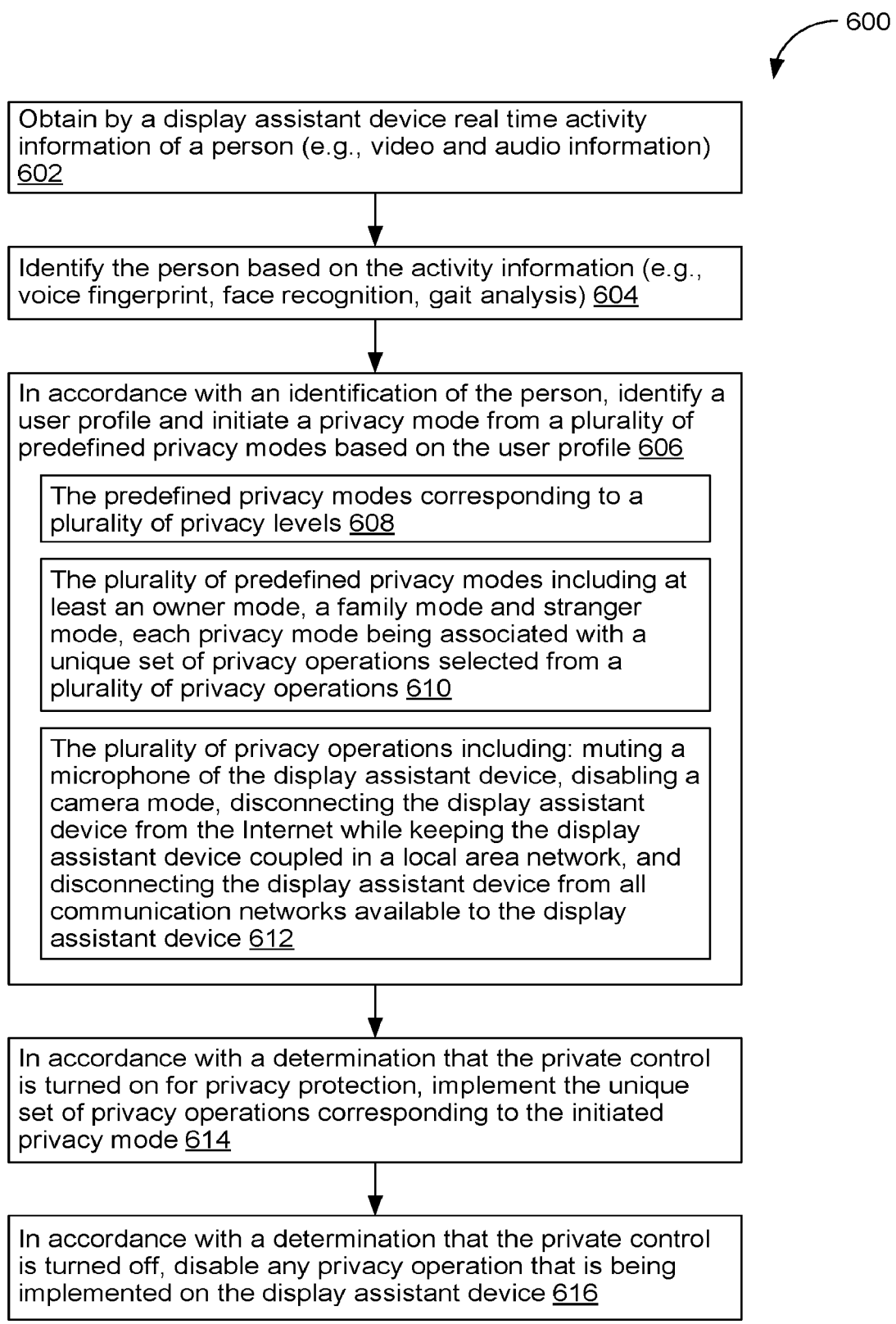
FIG. 6 is a flow chart of a method of adaptively controlling privacy settings of a display assistant device in accordance with some implementations.

FIG. 6 is a flow chart of a method 600 of adaptively controlling privacy settings of a display assistant device 500 in accordance with some implementations. As explained above, a privacy control 346 is disposed on the rear surface 506 of the screen 504, and is configured to enable a privacy operation, e.g., muting a microphone, disabling a camera, disconnecting the display assistant device 500 from the Internet while keeping it in a local area network, and disconnecting the display assistant device 500 from all communication networks. In some implementations, when the privacy control 346 is turned on for privacy protection, it dynamically activates one of a group of privacy operations based on a user profile of a user who is identified as associated with the display assistant device 500 in real time (e.g., a person whose image or voice is captured and recognized by the display assistant device 500). Specifically, in an example, the display assistant device 500 has an owner mode, a family mode and a stranger mode each of which is associated with a unique subset of the group of privacy operations, and the user profile is associated with one of these three modes. For example, if the display assistant device 500 cannot recognize voice of the user and identify the user as a stranger (e.g., an intruder), it enables the stranger mode in which the display assistant device 500 does not provide any privacy protection, e.g., muting the microphone and disconnecting from the communication networks, even if the privacy control 346 has been tuned on for privacy protection. Alternatively, if the display assistant device 500 recognizes the user as an owner, it enables the owner mode in which the display assistant device 500 mutes the microphone and disconnect itself from all communication networks when the privacy control 346 is tuned on for privacy protection. Alternatively, if the display assistant device 500 recognizes the user as a family member of the owner, it enables the family mode in which the display assistant device 500 mutes the microphone without disconnecting itself from any communication network when the privacy control 346 is tuned on for privacy protection.

Stated another way, when the privacy control 346 has been turned on for privacy protection, the display assistant device 500 identifies the user and corresponding user profile (that includes a privacy mode, e.g., a stranger mode), and dynamically activates one or more privacy operations according to the corresponding privacy mode. Further, in some implementations, in accordance with the user profile of the user, the one of the group of operations associated with the display assistant device 500 varies according to a time of a day. For example, when the privacy control 346 has been turned on for privacy protection, the same owner mode may mute the microphone during daytime hours, but unmute the microphone and disconnect all communication networks during night hours. It is noted that when the privacy control 346 has been turned off, no privacy protection is available and the display assistant device 500 does not implement any privacy operation regardless of the privacy mode of the display assistant device 500.

Specifically, in accordance with the method 600 of adaptively controlling privacy settings, the display assistant device 500 obtains (602) via a display assistant device 500 real time activity information of a person (e.g., video and audio information captured by a camera and a microphone of the device 500). The person is identified (604) based on the activity information using voice fingerprints, face recognition, gait analysis or the like. In accordance with an identification of the person, the display assistant device 500 identifies (606) a user profile and initiate a privacy mode from a plurality of predefined privacy modes based on the user profile. Optionally, the predefined privacy modes correspond (608) to a plurality of privacy levels in a security hierarchy, and includes (610) at least an owner mode, a family mode and a stranger mode each of which is associated with a unique set of privacy operations selected from a plurality of privacy operations. In some implementations, the plurality of privacy operations includes (612): muting a microphone of the display assistant device 500, disabling a camera mode, disconnecting the display assistant device 500 from the Internet while keeping the display assistant device 500 coupled in a local area network, and disconnecting the display assistant device 500 from all communication networks available to the display assistant device 500.

In accordance with a determination that the private control 346 is turned on for privacy protection, the display assistant device 500 implements (614) the unique set of privacy operations corresponding to the initiated privacy mode. In accordance with a determination that the private switch 516 is turned off, the display assistant device 500 disables (616) any privacy operation that is being implemented on the display assistant device 500.

Figure 7A:
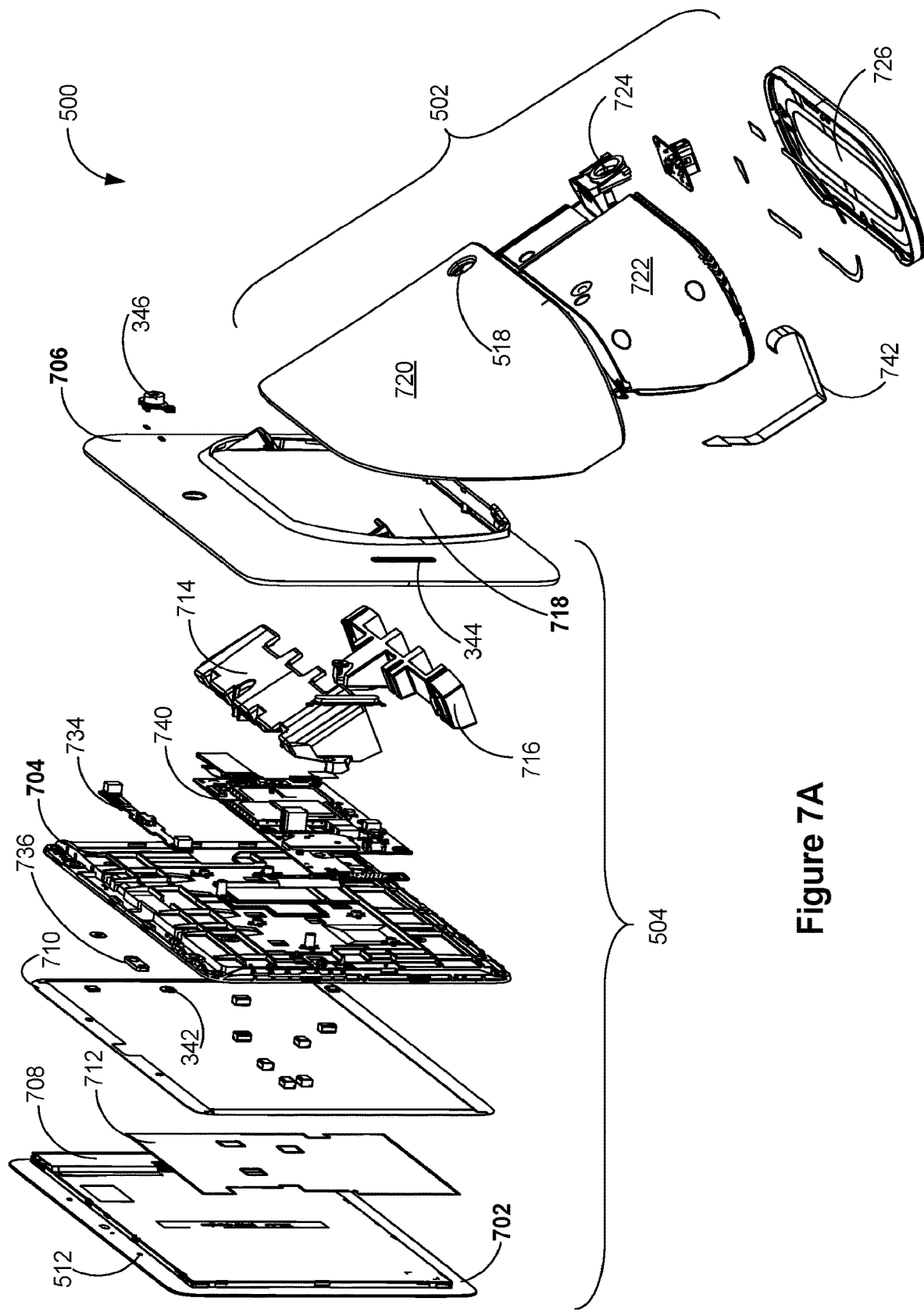
FIGS. 7A and 7B are two exploded views of a display assistant device from a rear perspective angle and a front perspective angle in accordance with some implementations, respectively.
Figure 7B:
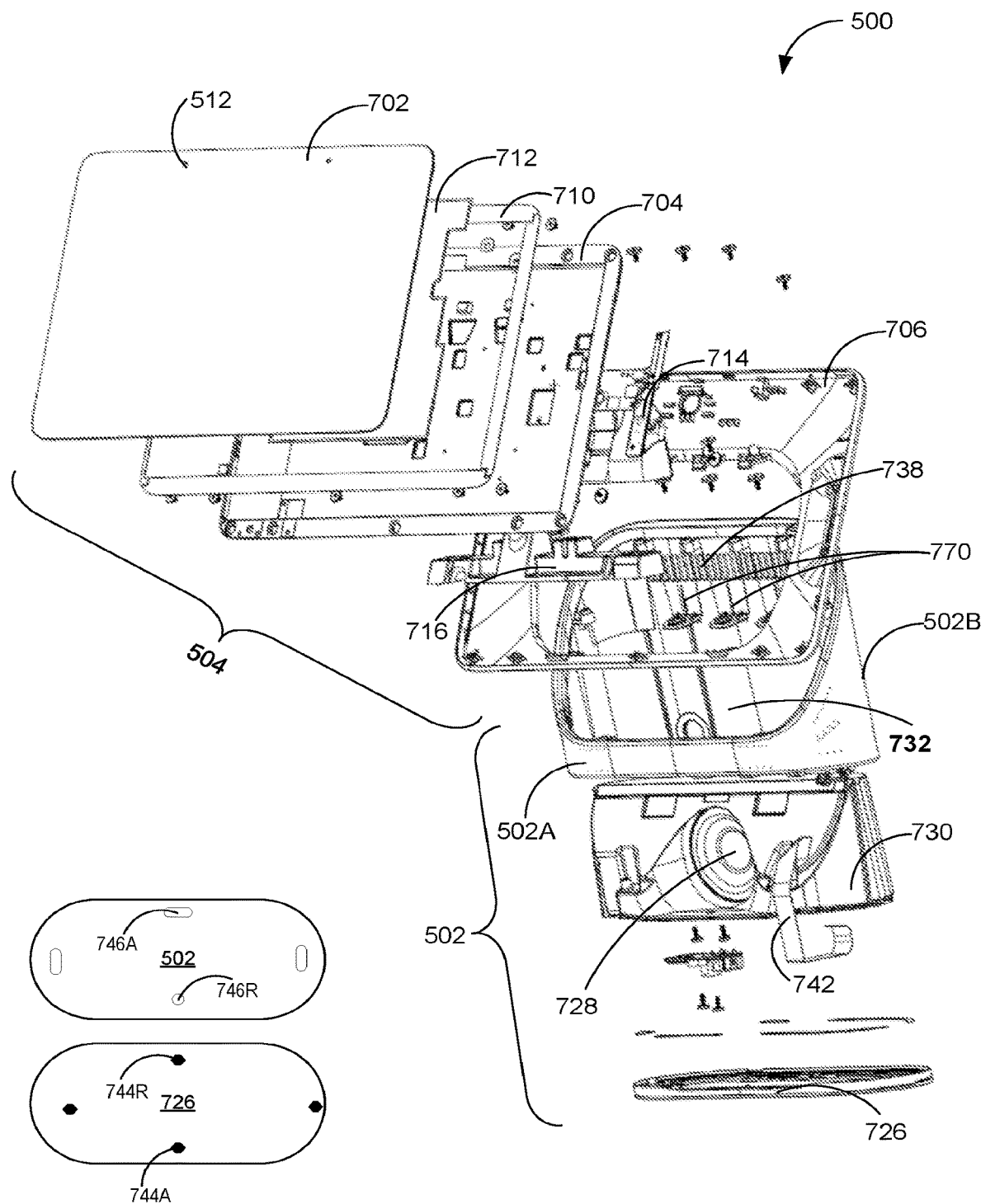

FIGS. 7A and 7B are two exploded views of a display assistant device 500 from a rear perspective angle and a front perspective angle in accordance with some implementations, respectively. The display assistant device 500 includes a base 502 and a screen 504. Referring to FIG. 7A, the screen 504 of the display assistant device 500 includes a display front 702, a middle frame 704 and a back cover 706. The display front 702 is coupled to a display module 708 that is configured to provide backlight sources and drive individual display pixels of the display front 702. Optionally, the display module 708 is disposed adjacent to an edge of the display front 702. The display front 702 and the middle frame 704 are mechanically coupled to each other using an adhesive 710 that is applied adjacent to edges of the display front 702 and middle frame 704. A thermal spreader 712 can be placed between and comes into contact with the display front 702 and middle frame 704 for redistribute heat generated by a display panel of the display front 702. The display front 702 has a rear surface made of conductive material (e.g., a metal plate), and when the thermal spreader 712 comes into contact with a portion of (e.g., half of) the rear surface of the display front 702, it redistributes heat evenly across itself and the portion of the rear surface of the display front 702, thereby avoiding formation of hot spots on the display front 702. In an example, the thermal spreader 712 includes a graphite sheet.

In some implementations, the display assistant device 500 further includes a main logic board 740 mounted on a rear surface of the middle frame 704. The main logic board 740 includes a plurality of electronic components that generate heat. A heat sink 714 is attached to the main logic board 740 to absorb the heat generated thereon. Optionally, the heat sink 714 is solid. Optionally, the heat sink 714 is hollow and contains an insert 716. The main logic board 740 and the heat sink 714 are attached to the rear surface of the middle frame 704, which is further assembled with the display front 702 and the back cover 706. The back cover 706 includes a first opening 718 at a central portion of the rear surface of the screen 504. When the back cover 706 is assembled onto the screen 504, the main logic board 740 and the heat sink 714 are aligned with the first opening 718 and protrude out of the first opening 718 of the back cover 706.

In some implementations, when the heat sink 714 is attached to the main logic board 740, it comes into contact with the plurality of electronic components (e.g., a processor component) that generate heat while being suspended on top of space that separates the plurality of electronic components. Alternatively, in some implementations, the plurality of heat generating electronic components are surrounded by a shield fence. The heat sink 714 is then mounted on top of the shield fence to conceal the heat generating electronic components.

Referring to FIG. 7A, the base 502 of the display assistant device 500 includes a housing 720, a speaker assembly 722, a power board 724 and a base mount plate 726. The housing 720 encloses the speaker assembly 722, and includes a plurality of speaker grill portions that permit sound generated by the speaker assembly 722 to exit the housing 720 of the base 502. Referring to FIG. 7B, the speaker assembly 722 includes a speaker 728 embedded in a speaker waveguide 730. The speaker 728 faces a space of the predefined height h that is configured to separate the bottom edge 508 of the screen 504 and a surface on which the display assistant device 500 sits. A speaker opening of the speaker 728 has a dimension substantially greater than the predefined height h of the space and faces forward while being tilted downward with a tilting angle (e.g., angle A in FIG. 8), such that the speaker 728 is configured to project a substantial portion of sound generated by the speaker forward and towards the space between the bottom edge of the screen. The speaker waveguide 730 is configured to guide sound generated by the speaker 728 further towards different areas of the housing 720. Specifically, for example, the plurality of speaker grill portions (e.g., 738) of the housing 720 are distributed on at least a front side, a rear side, a left side and a right side of the housing, and therefore, the sound generated by the speaker 728 is guided inside the housing by the speaker waveguide 730 to exit the housing 720 from its front, rear, left and right sides. More details on the speaker waveguide 730 and speaker grill portions of the housing 720 are discussed below with reference to FIG. 8.

In some implementations, the housing 720 is covered by a fabric, and the plurality of speaker grill portions are concealed behind the fabric. Stated another way, the plurality of speaker grill portions are not visible to a user of the display assistant device from an exterior look. Optionally, the fabric is secured to the housing 720 by a thermally activated adhesive that is applied in selective areas as to prevent the fabric from moving during speaker operation and also not occlude sound output. In some implementations, the fabric may be tensioned over the housing and held in place by mechanical clamping. The fabric is cut open at the power adapter interface 518, and wrapped around a circular edge of the power adapter interface 518.

The power board 724 is also contained within the housing 720. In some embodiments, the power board 724 is embedded in a rear portion of the speaker waveguide 730 and aligned with the power adapter interface 518, when the speaker waveguide 730 is assembled into the base 502. The rear portion of the speaker waveguide 730 is opposite to the speaker opening and inaccessible to the sound generated by the speaker 728 so that the power board 724 does not disturb sound propagation in the base 502. The power board 724 is electrically coupled to the power adaptor interface 518 exposed on the rear surface 502B of the base 502 to access an external power source, while it is also electrically coupled to the main logic board 740 of the display assistant device 500 via a flexible printed circuit board (PCB) or interconnect cable 742. By these means, the power board 724 is configured to drive the main logic board 740 of the display assistant device 500 with the external power source.

The front surface 502A of the housing 720 is shorter than the rear surface 502B of the housing 720, e.g., a height of the front surface 502A is only 20% of that of the rear surface 502, such that the housing 720 has a tilted opening 732 on its top. The tilted opening 732 is configured to receive the screen 504, including the main logic board 740 and the heat sink 714 that protrudes out of the first opening 718 of the back cover 706. The heat sink 714 is configured to protrude into and fit within the base 502 via the tilted opening 732 of the base 502. The tilted opening 732 of the base 502 is configured to enclose the first opening 718 of the back cover 706. That said, a central portion of the rear surface 506 of the screen 504 is covered by the base 502. Optionally, the central portion of the rear surface 506 covered by the base 502 accounts for 50-70% of an entire area of the rear surface 506. In some implementations, to assemble the back cover 706 to the base 502, each edge of the first opening 718 of the back cover 706 is fastened to an interior surface of the housing 720 via one or more fasteners (e.g., screws). For example, top and bottom edges of the first opening 718 of the back cover 706 are fastened to interior rear and front surfaces of the housing 720, respectively.

The base mount plate 726 is made of flexible material and mechanically coupled to a body of the base 502 (e.g., a bottom portion of the speaker assembly 722) via at least an edge of the base mount plate 726 (e.g., a peripheral edge surrounding the base mount plate 726). In some implementations, the edge of the base mount plate 726 included a raised portion configured to wrap around the edge of the body of the base 502 to which the base mount plate 726 is attached. The edge of the body of the base 502 optionally has a holding structure to couple to the raised portion the base mount plate 726, thereby facilitating the edge of the base mount plate 726 to hold onto the body of the base 502. In some implementations, the base mount plate 726 is made of an anti-slip material (e.g., silicone) and has a bottom surface that has a predefined friction coefficient with the surface on which the display assistant device 500 is configured to sit. The predefined friction coefficient is greater than a threshold friction coefficient such that the base can sit on the surface tightly. Optionally, the bottom surface of the base mount plate 726 has a substantially concave shape that recesses slightly towards the body of the base 502.

Further, in some implementations, the base mount plate 726 further includes a top surface opposing the bottom surface, and the top surface includes a plurality of stud fasteners 744 configured to mate with a plurality of receiving fasteners 746 on a bottom surface of the body of the base 502 (e.g., a bottom surface of the speaker waveguide 730). The plurality of receiving fasteners 746 includes at least a reference receiving fastener 746R. A reference stud fastener 744R has a shape that is substantially complementary to a shape of the reference receiving fastener 746R except that a dimension of the reference stud fastener 744R is slightly bigger than a dimension of the reference receiving fastener 746R, such that the reference stud fastener 744R can be fit into the corresponding reference receiving fastener 746R substantially tightly. Optionally, the plurality of receiving fasteners 746 includes one or more adjustable receiving fasteners 746A in addition to the reference receiving fastener 746R. For example, each adjustable receiving fastener 746A includes a groove fastener having an extended length. a corresponding stud fastener 744A has a width slightly greater than that of the groove fastener but a length substantially smaller than that of the groove fastener, such that the corresponding stud fastener 744A can be fit into the groove structure tightly at the width of the groove fastener while sliding along the extended width of the groove fastener. In some implementations, all of the plurality of stud fasteners 744 are identical, and the reference receiving fastener 746R has a shape that is distinct from shapes of the one or more adjustable receiving fasteners 746A.

Specifically, in an example, the base mount plate 726 has an elliptical shape having a long axis and a short axis. Four stud fasteners 744 are disposed adjacent to the edge of the base mount plate 726. Two of the stud fasteners 744 are placed on the long axis and two of the stud fasteners 744 are placed on the short axis. Each of the stud fasteners 744 has a hexagonal shape. One of four corresponding receiving fasteners 746R is a circular hole at the bottom surface of the body of the base 502, and the circular hole is slightly smaller than the hexagonal shape of the stud fastener 744 to allow the stud fastener 744 to squeeze into the circular hole tightly. Each of the other three corresponding receiving fasteners 746A includes a groove fastener located at the bottom surface of the body of the base 502, and the groove fastener is slightly narrower than the hexagonal shape of the stud fasteners 744 to allow the stud fasteners to squeeze into the groove fasteners tightly while being able to move in a groove.

It is also noted that positions of the stud fasteners 744 and the receiving fasteners 746 can be swapped in some implementations, i.e., the top surface of the base mount plate 726 includes a plurality of receiving fasteners 746 configured to mate with a plurality of stud fasteners 744 on the bottom surface of the body of the base 502. Alternatively, in some implementations, the base mount plate 726 is coupled to the body of the base 502 using an adhesive.

Figure 8:
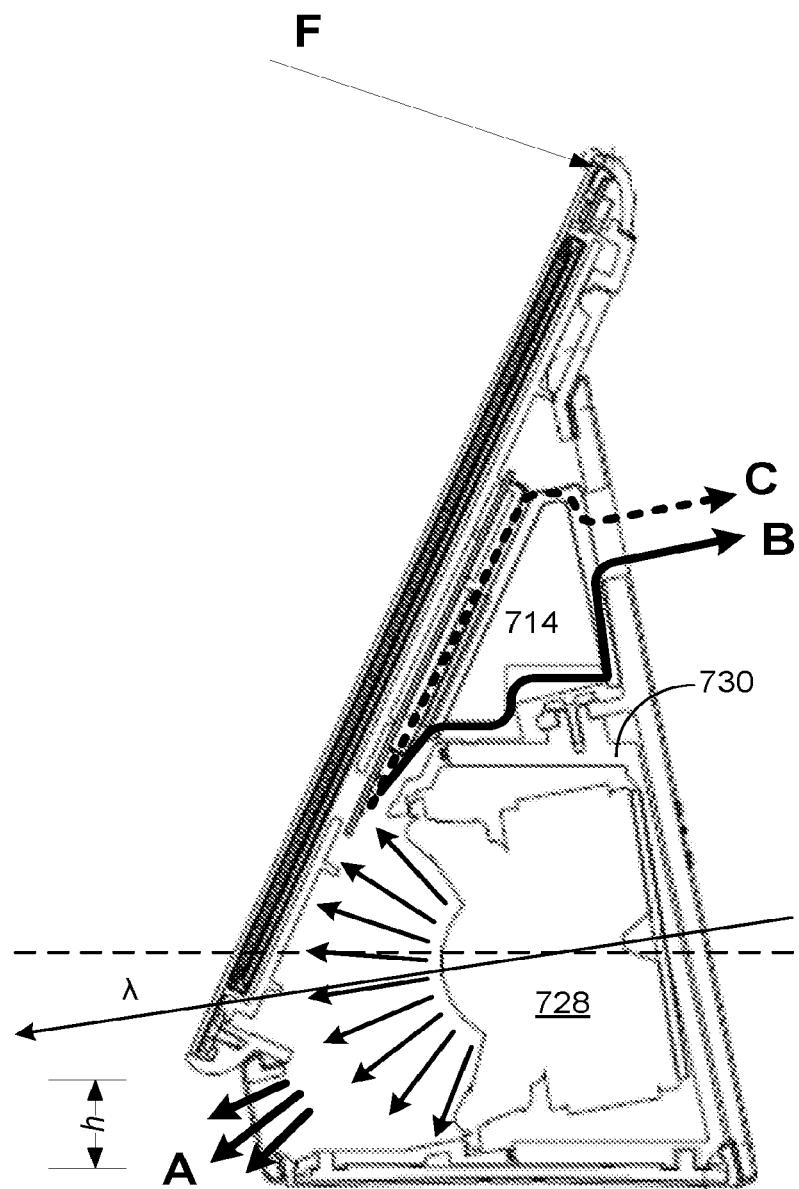
FIG. 8 is a cross sectional view of a display assistant device in accordance with some implementations.

FIG. 8 is a cross sectional view of a display assistant device 500 in accordance with some implementations. The display assistant device 500 includes a speaker assembly 722, and the speaker assembly 722 further includes a speaker 728 held in a speaker waveguide 730. The speaker 728 is concealed inside the base 502 and has a speaker opening. The speaker opening has a dimension substantially greater than a predefined height h of the space separating a bottom edge of the screen 504 and the surface on which the display assistant device 500 is configured to sit. The speaker opening faces forward and is tilted downward with a tilting angle A.

The speaker 728 is configured to project sound substantially towards a front view of the display assistant device 500, i.e., project a substantial portion of sound generated by the speaker 728 towards the space between the bottom edge of the screen 504 and the surface. A housing 720 of the base 502 includes a plurality of speaker grill portions disposed on one or more of a front surface 502A, a rear surface 502B, a left side and a right side of the base 502. In some implementations, a substantial portion (e.g., 80% or more) of the sound generated by the speaker 728 exits the base 502 via speaker grill portions on the front surface 502A of the base 502. Remaining portions of the sound generated by the speaker 728 are guided inside the housing 720 to exit the base 502 via a subset of speaker grill portions that are disposed on one or more of the rear surface 502B, left side and right side of the base 502.

More specifically, a speaker opening of the speaker 728 includes an upper portion and a lower portion that face a tilted rear surface of the screen 504 and a front side of the housing 720, respectively. In accordance with a sound propagation path A, sound projected from the lower portion of the speaker 728 is configured to exit the base 502 from a first speaker grill portion located on the front side of the housing 720. On the other hand, when the screen 504 is assembled to the base 502, the heat sink 714 protrudes beyond the first opening 718 at the rear surface 506 of the screen 504 and fits into an upper portion of the base 502. That said, the heat sink 714 is suspended above the speaker waveguide 730 and separated therefrom by a first space. In accordance with a sound propagation path B, sound projected from the upper portion of the speaker 728 is configured to be reflected by the tilted rear surface of the screen 504 and guided through the first space to exit the base 502 from a second speaker grill portion 738 located on a rear side of the housing 720. In some implementations, the heat sink 714 is hollow but filled with an insert 716 (e.g., made of plastic), and the sound projected from the upper portion of the speaker 728 is limited along the sound propagation path B without being disturbed by a hollow structure of the heat sink 714.

In some implementations, part of the heat sink is in contact with one or more electronic components (e.g., a processor unit), and part of the heat sink is separated from the main logic board 740 by a third space. In accordance with a sound propagation path C, part of the sound projected from the upper portion of the speaker 728 is configured to be reflected by the tilted rear surface of the screen 504 and guided through the third space between the main logic board 740 and the heat sink 714 to exit the base 502 from the second speaker grill portion 738 located on the rear side of the housing 720.

It is noted that when the heat sink 714 protrudes into the base 502, it is substantially close to an interior rear surface of the housing 720, e.g., the first gap next to the interior rear side of the housing 720 has a width of 2 mm or less. In some implementations, referring to FIG. 7B, the interior rear surface of the housing 720 includes a plurality of crush ribs 770 extending along a direction of the sound propagation path B. The plurality of crush ribs 770 are configured to guide the sound projected from the upper portion of the speaker 728 through the first space to exit the speaker assembly 722 via the second speaker grill portion 738. In some implementations, each of the plurality of crush ribs 770 tapers when it extends from a lower position on the interior rear surface of the housing 720 to the second speaker grill portion 738. That said, when each crush rib 770 has a semicircular cross section, a radius of the cross section is configured to shrink gradually when the crush rib 770 extends to the second speaker grill portion 738. In some implementations, when the heat sink 714 is disposed into the base 502, it comes into contact with and is pushed onto the plurality of crush ribs 770.

The speaker assembly 722 is disposed in a lower portion of a base 502 to lower down a center of mass of the entire display assistant device 500. In some implementations, for the purposes of lowering down the center of mass, a speaker assembly having a larger weight is selected over a speaker assembly having a smaller weight when their costs or speaker box volumes are comparable. For example, a speaker has a volume of 120 cc, and a Ferrite based speaker is selected over a Neodymium based speaker because of its weight advantage. Given its center of mass and weight, the display assistant device 500 does not tip over (forward or backward) easily when a blunt force F hits a top edge of the display assistant device 500 or a user touch occurs to the screen 504 of the display assistant device 500. For example, the center of weight is configured so that the display assistant device 500 can sustain an impact force of 50 Newton without tipping over.

In some implementations not shown in FIG. 8, the speaker waveguide 730 includes two shoulders each of which is recessed and separated from the housing 720 by a respective second space, and the sound projected from the speaker is configured to be reflected by the tilted rear surface of the screen 504 and the front side of the housing 720, and guided through the second spaces to exit the base 502 from two speaker grill portions located on the left and right sides of the housing 720 (not shown in FIG. 8). In some implementations, the two shoulders of the speaker waveguide 730 have different shapes, e.g., have a hyperbolic shape and a parabolic shape, respectively. In some implementations, the second and third spaces are created to eliminate air disturbance associated with the sound that exits the base via the front side of the housing 720 and thereby reduce noise in the sound broadcasted from the speaker 728. More details on the speaker assembly 722 of the display assistant device 500 are discussed with reference to U.S. Provisional Patent Application No. 62/743,464, filed Oct. 9, 2018, titled "Speaker Assembly of a Display Assistant Device," which is hereby incorporated by reference in its entirety.

Figure 9A:
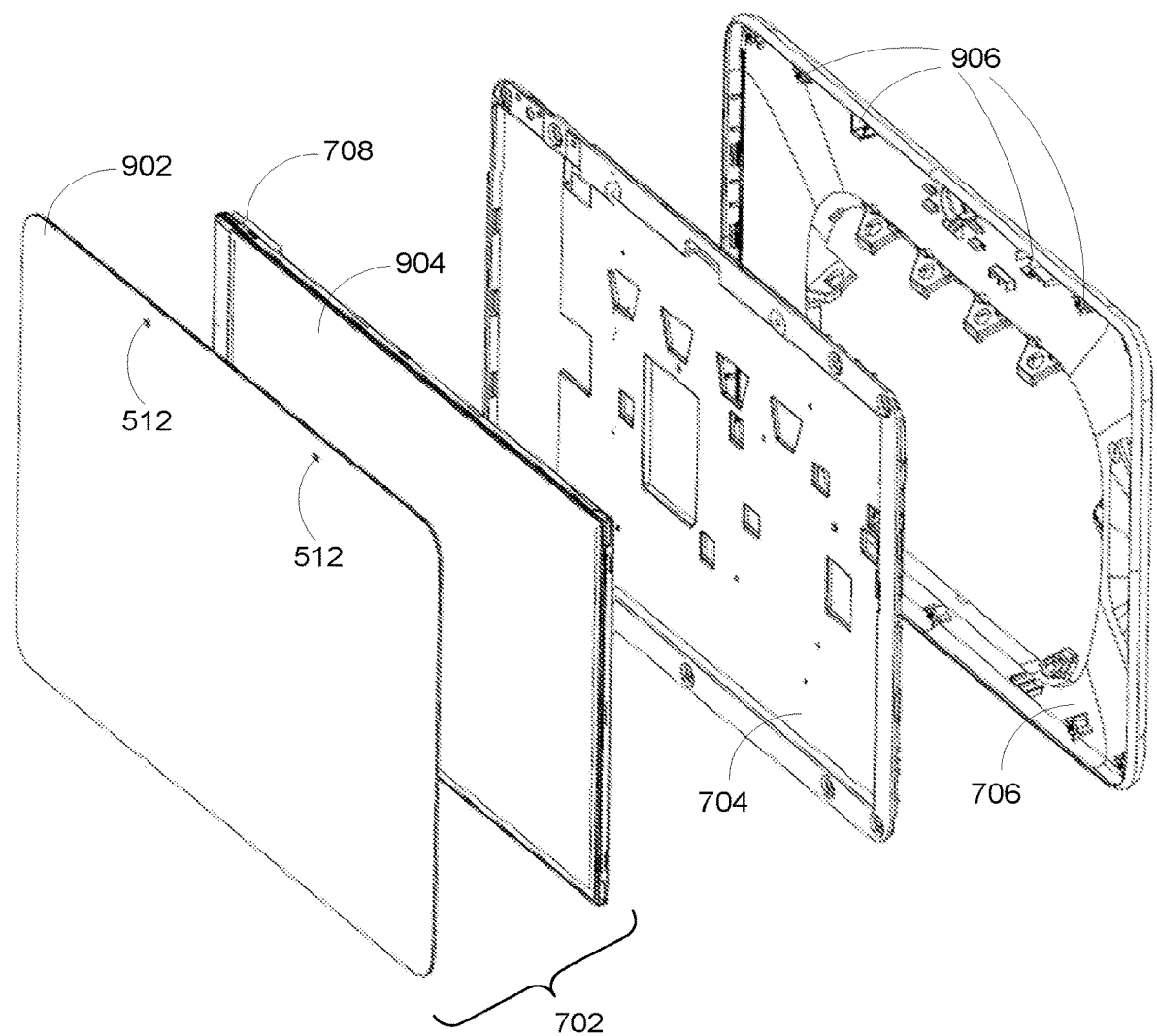
FIG. 9A is an exploded view of a screen including a cover glass, a display panel, a middle frame and a back cover of a display assistant device in accordance with some implementations.
Figure 9B:
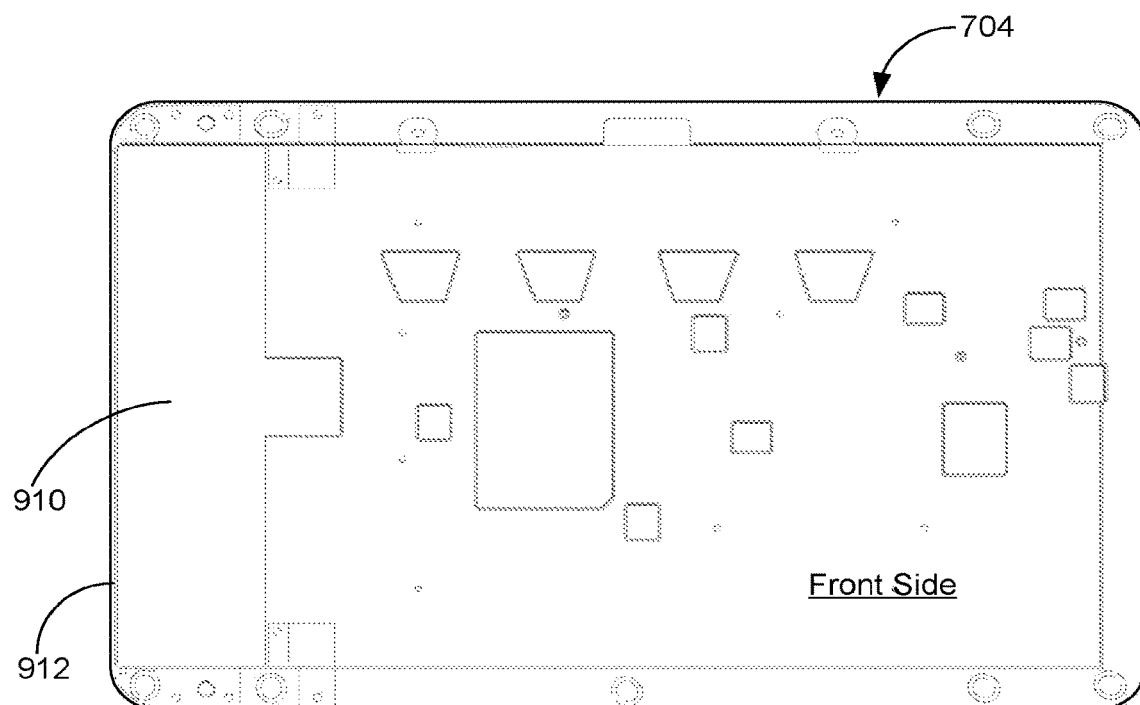
FIGS. 9B and 9C are two opposite sides of a middle frame of a display assistant device in accordance with some implementations, respectively.
Figure 9C:
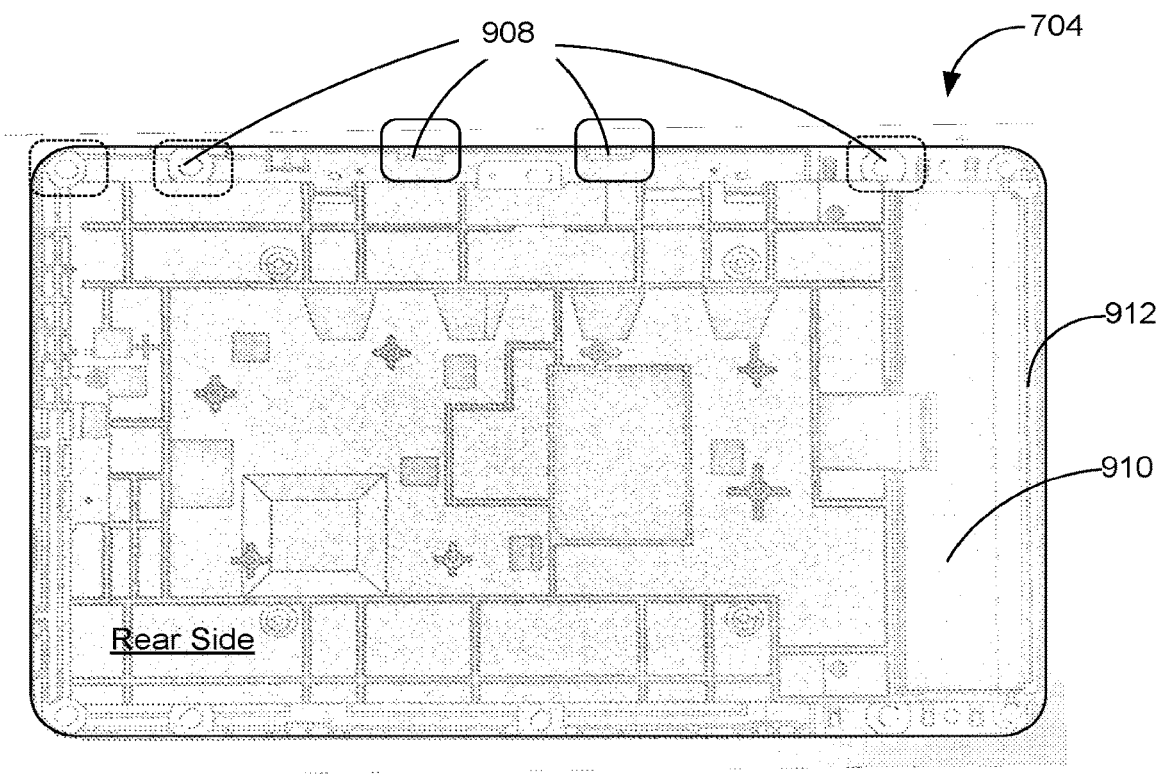

FIG. 9A is an exploded view of a screen 504 including a cover glass 902, a display panel 904, a middle frame 704 and a back cover 706 of a display assistant device 500 in accordance with some implementations, and FIGS. 9B and 9C are two opposite sides of a middle frame 704 of a display assistant device 500 in accordance with some implementations, respectively. In some implementations, the cover glass 902 and the display panel 904 are integrated in a display front 702, which is optionally obtained as an off-the-shelf module. Edge areas of a rear surface of the cover glass 902 are covered with paint to define a bezel area surrounding an active display area of the screen 504. In some implementations, the bezel area includes one or more microphone holes 512. One or more microphones 342 are placed behind the microphone holes 512 and configured to collect sound from the ambient of the display assistant device 500. The display panel 904 has a rear surface made of thermally and electrically conductive material (e.g., a metal plate). When a thermal spreader 712 is attached to a portion of the rear surface of the display panel 904, it redistributes heat evenly across itself and the portion of the rear surface of the display panel 904, thereby avoiding formation of hot spots on the display panel 904.

The middle frame 704 is disposed between the display front 702 and the back cover 706. In some implementations, the middle frame 704 is mechanically coupled to the display front 702 using an adhesive 710 that is applied adjacent to edges of the display front 702 and middle frame 704. The middle frame 704 has a plurality of first retention elements 906, and each first retention element is formed on a rear surface of the middle frame 704 and adjacent to an edge of the middle frame 704. The back cover 706 has a plurality of second retention elements 908 that are complementary to and configured to be mated to the plurality of first retention elements 906. When the middle frame 704 (which has been integrated with the display front 702) and the back cover 706 are aligned and assembled to each other, the plurality of first and second retention elements 906 and 908 are mated to each other and configured to control an in-plane displacement of edges of the back cover 706 in response to an impact of a force on the edges of the back cover 706, thereby limiting an out-of-place displacement of each edge of the back cover 706 and protecting edges of the display front 702 from falling apart from the edges of the back cover 706. More details on drop protection features of the display assistant device 500 (e.g., the first and second retention elements 906 and 908) are discussed with reference to U.S. Provisional Patent Application No. 62/742,888, filed Oct. 8, 2018, titled "Drop Protection for a Display Assistant Device," which is hereby incorporated by reference in its entirety.

Referring to FIG. 7A, the display panel 904 of the display front 702 is coupled to a display module 708 that is configured to provide backlight sources and drive individual display pixels of the display panel 904. Optionally, the display module 708 is disposed adjacent to an edge of the display panel 904. The display module 708 protrudes from the rear surface of the display panel 904. Referring to FIGS. 9A and 9B, the middle frame 704 includes a void area 910 configured to receive the display module 708. That said, when the middle frame 704 is integrated with the display front 702, the protruded display module 708 sits and is enclosed in the void area of the middle frame 704.

In some implementations, the middle frame 704 is substantially made of polymeric material (e.g., glass-reinforced polycarbonate). For example, a predetermined amount (e.g., 30%) of glass fibers is added to polycarbonate to increase tensile strength, stiffness and compressive strength, and reduce the thermal expansion coefficient of the middle frame 704. Further, in some implementations, the middle frame 704 includes a metal insert 912, i.e., a portion of the middle frame 704 is made of metal. The metal insert 912 is configured to create the void area 910. For example, referring to FIGS. 9B and 9C, the metal insert 912 includes a substantially thin edge of the middle frame 704 attached to a polymeric body of the middle frame 704. The metal insert 912 is configured to provide mechanical rigidity to the middle frame and sustain a mechanical impact (e.g., a force causing twisting and warping of the substantially thin edge) that could occur when the middle frame 704 is assembled with the display front 702. Optionally, the adhesive 710 is applied on the metal insert 912 to mechanically couple the display front 702 and the middle frame 704 to each other. In some implementations, the rear surface of the display panel 904 is made of electrically conductive material. The metal insert 912 is extended to touch the rear surface of the display panel 904, such that the metal insert 912 and the display panel 904 are electrically coupled to each other and to the ground. As such, all of the display panel 904, the display module 708, and a plurality of circuit boards (e.g., the main logic board 740) in the display assistant device 500 are electrically coupled to the same ground at least for the purposes of protecting the display assistant device 500 from electrostatic discharge (ESD), e.g., up to 15 kV.

Figure 10A:
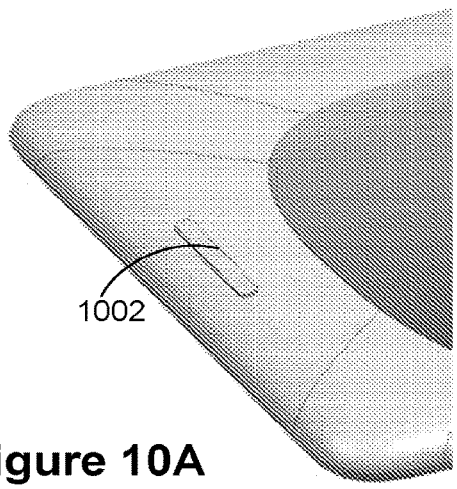
FIGS. 10A and 10B are a perspective view and a side view of part of a display electronic device that includes a control structure (e.g., a volume control) in accordance with some implementations.
Figure 10B:
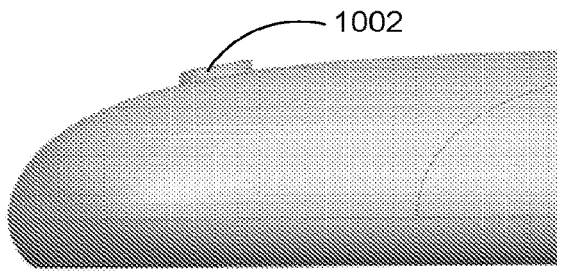
Figure 10C:
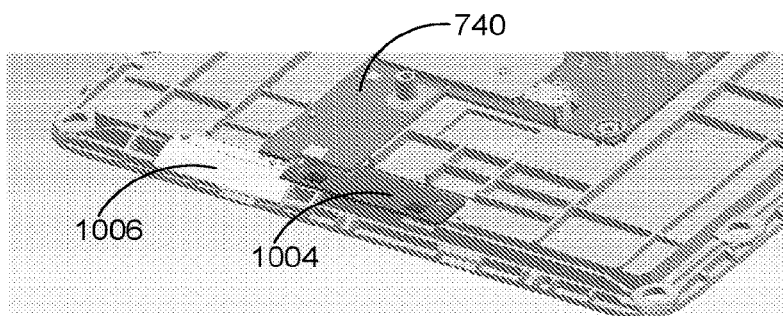
FIGS. 10C-10E are a recessed circuit board stack that is attached to a middle frame in a display assistant device 500 in accordance with some implementations.
Figure 10D:
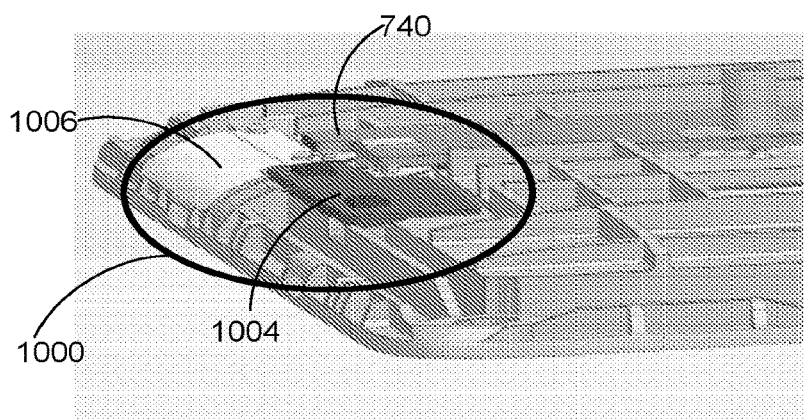
Figure 10E:
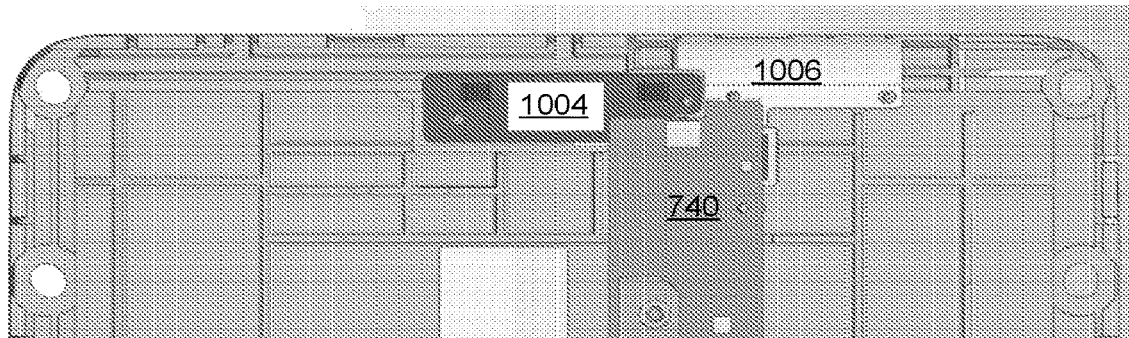

FIGS. 10A and 10B are a perspective view and a side view of part of a display assistant device 500 that includes a control structure 1002 (e.g., a volume control 344) in accordance with some implementations, and FIGS. 10C-10E are a recessed circuit board stack 1000 that is attached to a middle frame 704 in a display assistant device 500 in accordance with some implementations. The control structure 1002 is disposed on the rear surface 506 of the screen 504 and has a predefined distance from a first edge of the screen 504, such that when a user grabs edges of the display assistant device 500, the control structure 1002 is readily accessible to fingers of the user. The control structure 1002 is configured to receive a user input that activates one or more electrical functions of the display assistant device 500. An example of the control structure 1002 is the volume control 344. The volume control 344 includes a mechanical assembly (e.g., a button, a knob, a switch) configure to receive a user input for adjusting a volume level of the speaker in the display assistant device 500. In an example, the volume control 344 includes two buttons (separated or connected) configured to initiate an increase or decrease of the volume level of the speaker. In some implementations, the two buttons of the volume control 344 can be pressed concurrently to reset the display assistant device 500 independently of controlling the volume level of the speaker 728.

In the display assistant device 500, the recessed circuit board stack 1000 is disposed on a rear surface of the middle frame 704 and covered by the back cover 706, i.e., is sandwiched between the middle frame 704 and back cover 706. The circuit board stack 1000 is aligned with the control structure 1002 and configured to receive the user input applied on the control structure 1002. The circuit board stack 1000 includes a plurality of circuit boards, e.g., the main logic board 740, a daughter board 1004 and an antenna board 1006. To become part of the circuit board stack 1000, the main logic board 740 attached to a central portion of the middle frame 704 extends to the first edge of the screen 504. The plurality of circuit boards are partially stacked to each other and placed adjacent to the first edge of the screen.

A middle board of the plurality of circuit boards in the circuit board stack 1000 is electrically coupled to other two boards in the stack of boards via flip chip connections or using electronic spring pins (which are also called spring fingers). No separate interconnect cable is applied to electrically couple any two boards of the multiple boards in the circuit board stack 1000. In an example, the daughter board 1004 is aligned with and configured to contact the volume control 344 to sense the user input (e.g., a mechanical press) on the volume control 344. The daughter board 1004 is disposed between the main logic board 740 and the antenna board 1006 to at least electrically couple the main logic board 740 to the antenna board 1006.

In some implementations, the main logic board 740, the daughter board 1004 and the antenna board 1006 are recessed in a spatial sequence to conform to a rounded space sandwiched between the middle frame 704 and the back cover 706. Specifically, the antenna board 1006 includes an antenna structure printed on a flexible substrate. The antenna board 1006 conforms to a curvature of the rounded space sandwiched between the middle frame 704 and the back cover 706, and extends from the first edge of the screen 504 to a substantially flat region on the rear surface of the middle frame 704. The daughter board 1004 is disposed on the substantially flat region, and the main logic board 740 is extended to the substantially flat region, such that the main logic board 740, the daughter board 1004 and the antenna board 1006 can be electrically integrated in this substantially flat region. As such, the main logic board 740, the daughter board 1004 and the antenna board 1006 are mechanically arranged in a recessed manner from the first edge of the screen 504 to the substantially flat region.

In some implementations, an end of the antenna board 1006 is lifted up to a level of the daughter board 1004, and the main logic board 740 is directly coupled to the daughter board 1004 and the antenna board 1004 by a first number of electric pins and a second number of electrical pins, respectively. Optionally, each electric pin is mechanically driven by a spring. In some implementations, the end of the antenna board 1006 does not need to be lifted up to the level of the daughter board 1004. The main logic board 740 is directly coupled to the daughter board 1004 and the antenna board 1006 by the first number of spring-driven electric pins and the second number of spring-driven electrical pins, respectively. Alternatively, in some implementations, the antenna board 1006 is not directly coupled to the main logic board 740, and the daughter board 1004 is disposed between the main logic board 740 and the antenna board 1006 to couple the main logic board 740 to the antenna board 1006 electrically. In an example, the antenna board 1006 is electrically coupled to the daughter board 1004 via a third number of electric pins, and the daughter board 1004 is further coupled to the main logic board 740 via a fourth number of electric pins.

Referring to FIG. 7A, the display assistant device 500 includes the main logic board 740 and a plurality of secondary boards including the daughter board 1004 and a control board 734. The control board 734 is disposed adjacent to a long edge of the middle frame 704 and configured to drive at least one or more microphones 342 placed behind the microphone holes 512. In some implementations, The plurality of secondary boards and the main logic board 740 are originally made on the same substrate of a single printed circuit board, and separated to be assembled onto different locations in the display assistant device.

The antenna board 1006 includes one or more antennas configured to enable the display assistant device 500 to wirelessly communicate with other electronic devices, such as a hub device 180, a smart device 120, a client device 104, another display assistant device 500 and/or a server system 140. In some implementations, the antennas are configured to operate concurrently using two distinct frequencies. In some implementations, the antennas are configured to operate concurrently using two distinct communication protocols. In some implementations, one or more of the antennas is configured for broadband communications (e.g., Wi-Fi) and/or point-to-point communications (e.g., Bluetooth). In some implementations, one or more of the antennas is configured for mesh networking communications (e.g., ZWave). In some implementations, a first antenna (e.g., antenna-1) is configured for 2.4 GHz Wi-Fi communication and a second antenna (e.g., antenna-2) is configured for 5 GHz Wi-Fi communication. In some implementations, a first antenna (e.g., antenna-1) is configured for 2.4 GHz Wi-Fi communication and point-to-point communication, a second antenna (e.g., antenna-2) is configured for 5 GHz Wi-Fi communication and point-to-point communication, and a third antenna (e.g., antenna-3) is configured for mesh networking communication. In some implementations, two or more of the antennas are configured to transmit and/or receive data concurrently with others of the antennas.

In some implementations, the antennas of the display assistant device 500 include at least one dual-band Inverted-F Antenna (IFA). In some implementations, the antennas are made by flexible printed circuit (FPC), laser direct structuring (LDS), stamping, or other state of art antenna manufacturing technology. In some implementations, the size of the antenna is about quarter-wavelength at 2.4 GHz. In some implementations, each antenna includes a radiating element, a feed line, and a ground stub. In some implementations, at least one of the antennas includes a second ground stub. The second ground stub is adapted to match the antenna to both 2.4 GHz and 5 GHz. In some implementations, the antenna feed is the feeding point for the 2.4 GHz and 5 GHz WiFi signal. In some implementations, the feed point is connected to the output of a WiFi chip. In some implementations, the antennas include two identical IFA antennas. Both antennas are attached to the rear surface of the middle frame 704 and covered by the back cover 706.

Figure 11:
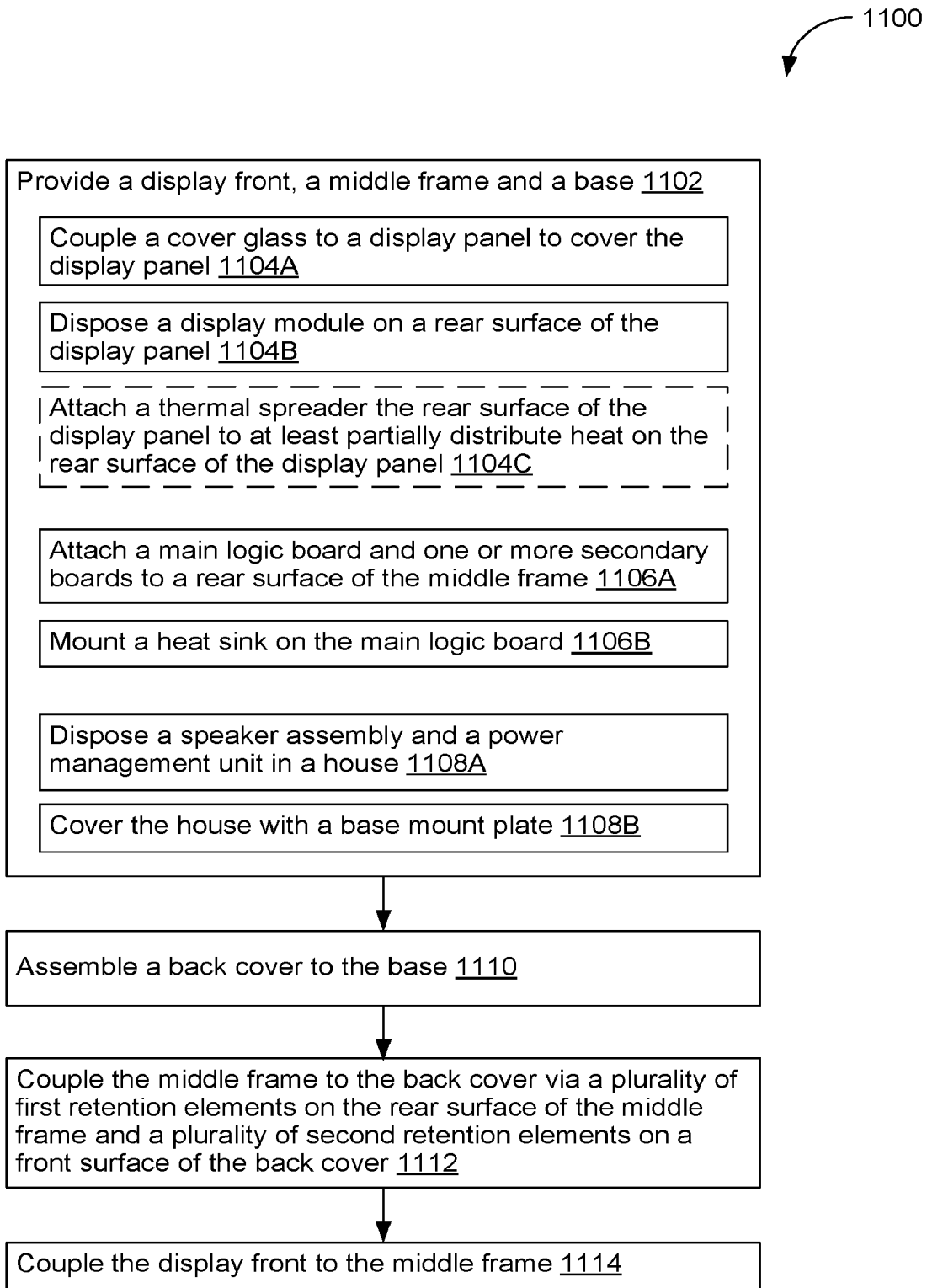
FIG. 11 is a flow chart of an example assembly process of a display assistant device 500 in accordance with some implementations.

FIG. 11 is a flow chart of an example assembly process 1100 of a display assistant device 500 in accordance with some implementations. A display front 702, a middle frame 704 and a base 502 are provided (1102) separately. Specifically, a cover glass 902 is coupled (1104A) to a display panel 904 to cover the display panel 904, and a display module 708 is disposed (1104B) on a rear surface of the display panel 904. Optionally, a thermal spreader 712 is attached (1104C) to the rear surface of the display panel 904 to at least partially distribute heat on the rear surface of the display panel 904. A main logic board 740 and one or more secondary boards are attached (1106A) to a rear surface of the middle frame 704, and a heat sink 714 is mounted (1106B) on the main logic board 740. The speaker assembly 722 and the power board 724 are disposed (1108A) in the housing 720, which is further covered (1108B) by a base mount plate 726. A back cover 706 is assembled (1110) to the base 502. Optionally, top and bottom edges of the first opening 718 of the back cover 706 are fastened to an interior rear surface and a front surface of the housing 720, respectively. After the back cover 706 is assembled (1110) to the base 502, the middle frame 704 is coupled (1112) to the back cover 706 via a plurality of first retention elements on the rear surface of the middle frame 704 and a plurality of second retention elements on a front surface of the back cover 706. The display front 702 is coupled (1114) to the middle frame 704 optionally via an adhesive that is applied adjacent to edges of the display front 702 and middle frame 704. It is noted that the order of the operations in the example assembly process 1100 of a display assistant device 500 can be varied.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is to be appreciated that "smart home environments" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or work space.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages can be implemented in hardware, firmware, software or any combination thereof.

The above description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A display assistant device comprising:
   a base having a housing configured for sitting on a surface, wherein the housing has a front surface and a rear surface, a height of the front surface being shorter than the rear surface such that the housing has a tilted surface on its top;
   a screen having a rear surface, where the screen is configured to be couplable to the base so that, when the screen is coupled to the base: the screen is supported at the rear surface by the housing of the base at the tilted surface, a bottom edge of the screen is held in front of the front surface and above the surface by a second height, and the base is hidden behind the screen from a front view of the display assistant device such that the screen appears to float in air from the front view of the display assistant device; and
   a speaker that is concealed inside a speaker waveguide of the housing of the base, wherein the speaker waveguide is configured to guide sound generated by the speaker towards a space of the second height separating the bottom edge of the screen and the surface on which the base is configured to sit.

2. The display assistant device as recited in claim 1, wherein the second height is less than a predetermined threshold.

3. The display assistant device as recited in claim 1, further comprising:
   a privacy switch arranged on the rear surface of the screen, the privacy switch being configured to enable one of a group of privacy operations.

4. The display assistant device as recited in claim 3, wherein the display assistant device is configured to associate the privacy switch that is turned on for privacy protection with one of the group of privacy operations dynamically based on a user profile of a user who is associated with the display assistant device in real time.

5. The display assistant device as recited in claim 4, wherein the display assistant device has an owner mode, a family mode and a stranger mode each of which is associated with a unique subset of the group of privacy operations, and the user profile is associated with one of the owner mode, the family mode, and the stranger mode.

6. The display assistant device as recited in claim 4, wherein, in accordance with the user profile of the user, the one of the group of privacy operations associated with the display assistant device varies according to a time of a day.

7. The display assistant device as recited in claim 4, further comprising a camera or a microphone configured to collect information of the user, wherein the collected information is used to identify the user who is associated with the display assistant device in real time and retrieve the user profile of the user.

8. The display assistant device as recited in claim 1, wherein the speaker faces the space of the second height that is configured to separate the bottom edge of the screen and the surface on which the base is configured to sit.

9. The display assistant device as recited in claim 8, wherein:
   the space between the bottom edge of the screen and the surface has the second height; and
   the speaker has a speaker opening, the speaker opening having a dimension greater than the second height of the space, the speaker opening facing forward and being tilted downward with a tilting angle.

10. The display assistant device as recited in claim 8, wherein the base has a housing that encloses the speaker, and the housing includes a plurality of speaker grill portions that permit sound generated by the speaker to exit the housing of the base.

11. The display assistant device as recited in claim 10, wherein the plurality of speaker grill portions are distributed on at least a front side, a rear side, a left side, and a right side of the housing, and the sound generated by the speaker is guided inside the housing to exit the housing from the front side, the rear side, the left side, and the right side of the housing.

12. The display assistant device as recited in claim 11, wherein the base extends along a central axis, and the screen and the central axis of the base are not perpendicular to the surface when the base sits on the surface.

13. The display assistant device as recited in claim 12, wherein the display assistant device is configured so that when the base sits on the surface that is flat, the central axis of the base leans forward by a base angle, and the screen leans backward by a screen angle and faces slightly upward.

14. The display assistant device as recited in claim 11, wherein the base includes a base mount plate that is mechanically coupled to a body of the base via at least an edge of the base mount plate.

15. The display assistant device as recited in claim 14, wherein the base mount plate further includes a top surface opposing a bottom surface, and the top surface includes a plurality of stud fasteners configured to mate with a plurality of receiving fasteners on the bottom surface of the body of the base.

16. The display assistant device as recited in claim 11, wherein only a central portion of the rear surface of the screen is covered by the base.

17. The display assistant device as recited in claim 11, wherein the screen is attachable to the base.

18. The display assistant device as recited in claim 11, wherein the screen is detachable from the base.

19. The display assistant device as recited in claim 11, wherein the screen includes a display panel, a middle frame, and a back cover.

20. The display assistant device as recited in claim 19, wherein the middle frame includes a metallic insert configured to provide mechanical rigidity to the middle frame.

* * * * *